United States Patent
Van Os et al.

(10) Patent No.: US 10,652,394 B2
(45) Date of Patent: May 12, 2020

(54) SYSTEM AND METHOD FOR PROCESSING VOICEMAIL

(71) Applicant: Apple Inc., Cupertino, CA (US)

(72) Inventors: Marcel Van Os, San Francisco, CA (US); Gregory B. Novick, Santa Clara, CA (US); Scott M. Herz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1032 days.

(21) Appl. No.: 14/213,241

(22) Filed: Mar. 14, 2014

(65) Prior Publication Data

US 2014/0273979 A1 Sep. 18, 2014

Related U.S. Application Data

(60) Provisional application No. 61/783,984, filed on Mar. 14, 2013.

(51) Int. Cl.
*H04M 3/533* (2006.01)

(52) U.S. Cl.
CPC ....... *H04M 3/533* (2013.01); *H04M 3/53333* (2013.01)

(58) Field of Classification Search
CPC .............. G10L 2015/088; G10L 15/26; H04M 2201/40; H04M 1/271; H04M 3/533; H04M 1/7255; H04M 2250/74; H04M 1/274516
USPC ............ 455/412.1, 412.2, 413, 414.1, 556.1, 455/556.2
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |

(Continued)

FOREIGN PATENT DOCUMENTS

| | | | |
|---|---|---|---|
| CH | 681573 A5 | | 4/1993 |
| CN | 202035047 U | * | 11/2011 |

(Continued)

OTHER PUBLICATIONS

International Search Report and Written Opinion received for PCT Patent Application No. PCT/US2010/037378, dated Aug. 25, 2010, 14 pages.

(Continued)

*Primary Examiner* — Jean A Gelin
(74) *Attorney, Agent, or Firm* — Dentons US LLP

(57) ABSTRACT

In one example, a recorded voicemail is first converted from speech to text, and a proposed action to be performed by the user is extracted from the voice message. For example, in the voicemail "this is John, call me at 650.987.0987 at 9 am tomorrow," the action is to call John. At least one action parameter for undertaking the action is determined. For example, the action parameters may include the 650.987.0987 telephone number and the 9 am time the following morning, The at least one action parameter may be extracted from the voicemail message or it may be determined by other means, e.g., from a user's contact book. Finally, the user is presented with a prompt to facilitate undertaking the action using the at least one the parameter. For example, the user may be given the option to set a reminder to call John the following morning at 9 am.

29 Claims, 9 Drawing Sheets

(56) References Cited

U.S. PATENT DOCUMENTS

| | | |
|---|---|---|
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,677,570 A | 6/1987 | Taki |
| 4,680,805 A | 7/1987 | Scott |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,829,583 A | 5/1989 | Monroe et al. |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,975,975 A | 12/1990 | Filipski |
| 4,977,598 A | 12/1990 | Doddington et al. |
| 4,992,972 A | 2/1991 | Brooks et al. |
| 5,007,098 A | 4/1991 | Kumagai |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,231,670 A | 7/1993 | Goldhor et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| 5,289,562 A | 2/1994 | Mizuta et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,296,642 A | 3/1994 | Konishi |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,103 A | 12/1994 | Lamberti et al. |
| 5,377,301 A | 12/1994 | Rosenberg et al. |
| 5,377,303 A | 12/1994 | Firman |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,758 A | 2/1996 | Bellegarda et al. |
| 5,491,772 A | 2/1996 | Hardwick et al. |
| 5,493,677 A | 2/1996 | Balogh et al. |
| 5,495,604 A | 2/1996 | Harding et al. |
| 5,500,905 A | 3/1996 | Martin et al. |
| 5,502,790 A | 3/1996 | Yi |
| 5,502,791 A | 3/1996 | Nishimura et al. |
| 5,515,475 A | 5/1996 | Gupta et al. |
| 5,533,182 A | 7/1996 | Bates et al. |
| 5,536,902 A | 7/1996 | Serra et al. |
| 5,537,618 A | 7/1996 | Boulton et al. |
| 5,544,264 A | 8/1996 | Bellegarda et al. |
| 5,555,343 A | 9/1996 | Luther |
| 5,574,823 A | 11/1996 | Hassanein et al. |
| 5,577,164 A | 11/1996 | Kaneko et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,649,060 A | 7/1997 | Ellozy et al. |
| 5,661,787 A | 8/1997 | Pocock |
| 5,664,055 A | 9/1997 | Kroon |
| 5,675,819 A | 10/1997 | Schuetze |
| 5,682,539 A | 10/1997 | Conrad et al. |

(56) References Cited

U.S. PATENT DOCUMENTS

| | | |
|---|---|---|
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,750 A | 3/1998 | Arai et al. |
| 5,734,791 A | 3/1998 | Acero et al. |
| 5,737,734 A | 4/1998 | Schultz |
| 5,742,705 A | 4/1998 | Parthasarathy |
| 5,748,974 A | 5/1998 | Johnson |
| 5,749,081 A | 5/1998 | Whiteis |
| 5,757,979 A | 5/1998 | Hongo et al. |
| 5,759,101 A | 6/1998 | Von Kohorn |
| 5,777,614 A | 7/1998 | Ando et al. |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,802,526 A | 9/1998 | Fawcett et al. |
| 5,812,697 A | 9/1998 | Sakai et al. |
| 5,812,698 A | 9/1998 | Platt et al. |
| 5,822,730 A | 10/1998 | Roth et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,841,902 A | 11/1998 | Tu |
| 5,845,255 A | 12/1998 | Mayaud |
| 5,857,184 A | 1/1999 | Lynch |
| 5,860,063 A | 1/1999 | Gorin et al. |
| 5,860,064 A | 1/1999 | Henton |
| 5,862,223 A | 1/1999 | Walker et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,890,122 A | 3/1999 | Van et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,909,666 A | 6/1999 | Gould et al. |
| 5,912,952 A | 6/1999 | Brendzel |
| 5,913,193 A | 6/1999 | Huang et al. |
| 5,915,236 A | 6/1999 | Gould et al. |
| 5,915,249 A | 6/1999 | Spencer |
| 5,920,836 A | 7/1999 | Gould et al. |
| 5,920,837 A | 7/1999 | Gould et al. |
| 5,930,408 A | 7/1999 | Seto |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | Delorme et al. |
| 5,950,123 A | 9/1999 | Schwelb et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | Leroy et al. |
| 5,974,146 A | 10/1999 | Randle et al. |
| 5,982,891 A | 11/1999 | Ginter et al. |
| 5,983,179 A | 11/1999 | Gould et al. |
| 5,987,132 A | 11/1999 | Rowney et al. |
| 5,987,140 A | 11/1999 | Rowney et al. |
| 5,987,404 A | 11/1999 | Della Pietra et al. |
| 5,987,440 A | 11/1999 | O'Neil et al. |
| 5,991,441 A | 11/1999 | Jourjine |
| 5,999,895 A | 12/1999 | Forest |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,035,267 A | 3/2000 | Watanabe et al. |
| 6,035,336 A | 3/2000 | Lu et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,767 A | 5/2000 | Muir et al. |
| 6,064,959 A | 5/2000 | Young et al. |
| 6,064,960 A | 5/2000 | Bellegarda et al. |
| 6,064,963 A | 5/2000 | Gainsboro |
| 6,070,139 A | 5/2000 | Miyazawa et al. |
| 6,070,147 A | 5/2000 | Harms et al. |
| 6,073,097 A | 6/2000 | Gould et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | De et al. |
| 6,088,671 A | 7/2000 | Gould et al. |
| 6,088,731 A | 7/2000 | Kiraly et al. |
| 6,092,043 A | 7/2000 | Squires et al. |
| 6,094,649 A | 7/2000 | Bowen et al. |
| 6,101,468 A | 8/2000 | Gould et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,138,098 A | 10/2000 | Shieber et al. |
| 6,144,938 A | 11/2000 | Surace et al. |
| 6,154,720 A | 11/2000 | Onishi et al. |
| 6,161,084 A | 12/2000 | Messerly et al. |
| 6,173,251 B1 | 1/2001 | Ito et al. |
| 6,173,261 B1 | 1/2001 | Arai et al. |
| 6,173,279 B1 | 1/2001 | Levin et al. |
| 6,177,905 B1 | 1/2001 | Welch |
| 6,188,999 B1 | 2/2001 | Moody |
| 6,195,641 B1 | 2/2001 | Loring et al. |
| 6,205,456 B1 | 3/2001 | Nakao |
| 6,208,956 B1 | 3/2001 | Motoyama |
| 6,208,971 B1 | 3/2001 | Bellegarda et al. |
| 6,226,403 B1 | 5/2001 | Parthasarathy |
| 6,233,545 B1 | 5/2001 | Datig |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,249,606 B1 | 6/2001 | Kiraly et al. |
| 6,259,826 B1 | 7/2001 | Pollard et al. |
| 6,260,011 B1 | 7/2001 | Heckerman et al. |
| 6,260,013 B1 | 7/2001 | Sejnoha |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,282,507 B1 | 8/2001 | Horiguchi et al. |
| 6,285,785 B1 | 9/2001 | Bellegarda et al. |
| 6,285,786 B1 | 9/2001 | Seni et al. |
| 6,289,124 B1 | 9/2001 | Okamoto |
| 6,308,149 B1 | 10/2001 | Gaussier et al. |
| 6,311,189 B1 | 10/2001 | deVries et al. |
| 6,317,594 B1 | 11/2001 | Gossman et al. |

(56) References Cited

U.S. PATENT DOCUMENTS

| | | |
|---|---|---|
| 6,317,707 B1 | 11/2001 | Bangalore et al. |
| 6,317,831 B1 | 11/2001 | King |
| 6,321,092 B1 | 11/2001 | Fitch et al. |
| 6,324,512 B1 | 11/2001 | Junqua et al. |
| 6,334,103 B1 | 12/2001 | Surace et al. |
| 6,345,250 B1 | 2/2002 | Martin |
| 6,353,794 B1 | 3/2002 | Davis et al. |
| 6,356,854 B1 | 3/2002 | Schubert et al. |
| 6,356,905 B1 | 3/2002 | Gershman et al. |
| 6,360,237 B1 | 3/2002 | Schulz et al. |
| 6,366,883 B1 | 4/2002 | Campbell et al. |
| 6,366,884 B1 | 4/2002 | Bellegarda et al. |
| 6,397,186 B1 | 5/2002 | Bush et al. |
| 6,401,065 B1 | 6/2002 | Kanevsky et al. |
| 6,421,672 B1 | 7/2002 | McAllister et al. |
| 6,430,551 B1 | 8/2002 | Thelen et al. |
| 6,434,522 B1 | 8/2002 | Tsuboka |
| 6,434,524 B1 | 8/2002 | Weber |
| 6,438,523 B1 | 8/2002 | Oberteuffer et al. |
| 6,442,518 B1 | 8/2002 | Van Thong et al. |
| 6,446,076 B1 | 9/2002 | Burkey et al. |
| 6,448,485 B1 | 9/2002 | Barile |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,463,128 B1 | 10/2002 | Elwin |
| 6,466,654 B1 | 10/2002 | Cooper et al. |
| 6,477,488 B1 | 11/2002 | Bellegarda |
| 6,487,534 B1 | 11/2002 | Thelen et al. |
| 6,489,951 B1 | 12/2002 | Wong et al. |
| 6,493,428 B1 | 12/2002 | Hillier |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,519,566 B1 | 2/2003 | Boyer et al. |
| 6,523,061 B1 | 2/2003 | Halverson et al. |
| 6,523,172 B1 | 2/2003 | Martinez-Guerra et al. |
| 6,526,351 B2 | 2/2003 | Whitham |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,971 B1 | 4/2003 | Rigsby et al. |
| 6,556,983 B1 | 4/2003 | Altschuler et al. |
| 6,563,769 B1 | 5/2003 | Van Der Meulen |
| 6,584,464 B1 | 6/2003 | Warthen |
| 6,598,022 B2 | 7/2003 | Yuschik |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,606,388 B1 | 8/2003 | Townsend et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,622,121 B1 | 9/2003 | Crepy et al. |
| 6,622,136 B2 | 9/2003 | Russell |
| 6,625,583 B1 | 9/2003 | Silverman et al. |
| 6,628,808 B1 | 9/2003 | Bach et al. |
| 6,631,346 B1 | 10/2003 | Karaorman et al. |
| 6,633,846 B1 | 10/2003 | Bennett et al. |
| 6,643,401 B1 | 11/2003 | Kashioka et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,658,389 B1 | 12/2003 | Alpdemir |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,680,675 B1 | 1/2004 | Suzuki |
| 6,684,187 B1 | 1/2004 | Conkie |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,694,295 B2 | 2/2004 | Lindholm et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,720,980 B1 | 4/2004 | Lui et al. |
| 6,721,728 B2 | 4/2004 | McGreevy |
| 6,721,734 B1 | 4/2004 | Subasic et al. |
| 6,728,675 B1 | 4/2004 | Maddalozzo, Jr. et al. |
| 6,728,729 B1 | 4/2004 | Jawa et al. |
| 6,731,312 B2 | 5/2004 | Robbin |
| 6,735,632 B1 | 5/2004 | Kiraly et al. |
| 6,741,264 B1 | 5/2004 | Lesser |
| 6,742,021 B1 | 5/2004 | Halverson et al. |
| 6,751,595 B2 | 6/2004 | Busayapongchai et al. |
| 6,754,504 B1 | 6/2004 | Reed |
| 6,757,362 B1 | 6/2004 | Cooper et al. |
| 6,757,718 B1 | 6/2004 | Halverson et al. |
| 6,760,754 B1 | 7/2004 | Isaacs et al. |
| 6,766,320 B1 | 7/2004 | Wang et al. |
| 6,772,123 B2 | 8/2004 | Cooklev et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,839,464 B2 | 1/2005 | Hawkins et al. |
| 6,839,669 B1 | 1/2005 | Gould et al. |
| 6,839,670 B1 | 1/2005 | Stammler et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,865,533 B2 | 3/2005 | Addison et al. |
| 6,882,971 B2 | 4/2005 | Craner |
| 6,885,734 B1 | 4/2005 | Eberle et al. |
| 6,895,380 B2 | 5/2005 | Sepe, Jr. |
| 6,895,558 B1 | 5/2005 | Loveland |
| 6,901,364 B2 | 5/2005 | Nguyen et al. |
| 6,901,399 B1 | 5/2005 | Corston et al. |
| 6,912,498 B2 | 6/2005 | Stevens et al. |
| 6,912,499 B1 | 6/2005 | Sabourin et al. |
| 6,915,246 B2 | 7/2005 | Gusler et al. |
| 6,917,373 B2 | 7/2005 | Vong et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,944,593 B2 | 9/2005 | Kuzunuki et al. |
| 6,954,755 B2 | 10/2005 | Reisman |
| 6,957,076 B2 | 10/2005 | Hunzinger |
| 6,960,734 B1 | 11/2005 | Park |
| 6,964,023 B2 | 11/2005 | Maes et al. |
| 6,968,311 B2 | 11/2005 | Knockeart et al. |
| 6,970,935 B1 | 11/2005 | Maes |
| 6,978,127 B1 | 12/2005 | Bulthuis et al. |
| 6,980,949 B2 | 12/2005 | Ford |
| 6,980,955 B2 | 12/2005 | Okutani et al. |
| 6,983,251 B1 | 1/2006 | Umemoto et al. |
| 6,985,865 B1 | 1/2006 | Packingham et al. |
| 6,988,071 B1 | 1/2006 | Gazdzinski |
| 6,996,520 B2 | 2/2006 | Levin |

(56) References Cited

U.S. PATENT DOCUMENTS

| | | |
|---|---|---|
| 6,996,531 B2 | 2/2006 | Korall et al. |
| 6,999,066 B2 | 2/2006 | Litwiller |
| 6,999,914 B1 | 2/2006 | Boerner et al. |
| 6,999,927 B2 | 2/2006 | Mozer et al. |
| 7,000,189 B2 | 2/2006 | Dutta et al. |
| 7,003,463 B1 | 2/2006 | Maes et al. |
| 7,010,581 B2 | 3/2006 | Brown et al. |
| 7,020,685 B1 | 3/2006 | Chen et al. |
| 7,024,363 B1 | 4/2006 | Comerford et al. |
| 7,024,364 B2 | 4/2006 | Guerra et al. |
| 7,027,974 B1 | 4/2006 | Busch et al. |
| 7,027,990 B2 | 4/2006 | Sussman |
| 7,031,530 B2 | 4/2006 | Driggs et al. |
| 7,036,128 B1 | 4/2006 | Julia et al. |
| 7,050,977 B1 | 5/2006 | Bennett |
| 7,054,888 B2 | 5/2006 | LaChapelle et al. |
| 7,058,569 B2 | 6/2006 | Coorman et al. |
| 7,058,888 B1 | 6/2006 | Gjerstad et al. |
| 7,058,889 B2 | 6/2006 | Trovato et al. |
| 7,062,428 B2 | 6/2006 | Hogenhout et al. |
| 7,069,220 B2 | 6/2006 | Coffman et al. |
| 7,069,560 B1 | 6/2006 | Cheyer et al. |
| 7,084,758 B1 | 8/2006 | Cole |
| 7,085,723 B2 | 8/2006 | Ross et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,107,204 B1 | 9/2006 | Liu et al. |
| 7,127,046 B1 | 10/2006 | Smith et al. |
| 7,127,403 B1 | 10/2006 | Saylor et al. |
| 7,136,710 B1 | 11/2006 | Hoftberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,149,319 B2 | 12/2006 | Roeck |
| 7,152,070 B1 | 12/2006 | Musick et al. |
| 7,166,791 B2 | 1/2007 | Robbin et al. |
| 7,174,295 B1 | 2/2007 | Kivimaki |
| 7,177,794 B2 | 2/2007 | Mani et al. |
| 7,177,798 B2 | 2/2007 | Hsu et al. |
| 7,190,794 B2 | 3/2007 | Hinde |
| 7,197,120 B2 | 3/2007 | Luehrig et al. |
| 7,197,460 B1 | 3/2007 | Gupta et al. |
| 7,200,559 B2 | 4/2007 | Wang |
| 7,203,646 B2 | 4/2007 | Bennett |
| 7,216,008 B2 | 5/2007 | Sakata |
| 7,216,073 B2 | 5/2007 | Lavi et al. |
| 7,216,080 B2 | 5/2007 | Tsiao et al. |
| 7,219,063 B2 | 5/2007 | Schalk et al. |
| 7,219,123 B1 | 5/2007 | Fiechter et al. |
| 7,225,125 B2 | 5/2007 | Bennett et al. |
| 7,228,278 B2 | 6/2007 | Nguyen et al. |
| 7,231,343 B1 | 6/2007 | Treadgold et al. |
| 7,233,790 B2 | 6/2007 | Kjellberg et al. |
| 7,233,904 B2 | 6/2007 | Luisi |
| 7,246,151 B2 | 7/2007 | Isaacs et al. |
| 7,251,313 B1 * | 7/2007 | Miller ............... H04M 3/53333 379/281 |
| 7,260,529 B1 | 8/2007 | Lengen |
| 7,266,496 B2 | 9/2007 | Wang et al. |
| 7,269,556 B2 | 9/2007 | Kiss et al. |
| 7,277,854 B2 | 10/2007 | Bennett et al. |
| 7,290,039 B1 | 10/2007 | Lisitsa et al. |
| 7,292,579 B2 | 11/2007 | Morris |
| 7,299,033 B2 | 11/2007 | Kjellberg et al. |
| 7,302,392 B1 | 11/2007 | Thenthiruperai et al. |
| 7,302,686 B2 | 11/2007 | Togawa |
| 7,310,600 B1 | 12/2007 | Garner et al. |
| 7,315,818 B2 | 1/2008 | Stevens et al. |
| 7,319,957 B2 | 1/2008 | Robinson et al. |
| 7,324,947 B2 | 1/2008 | Jordan et al. |
| 7,349,953 B2 | 3/2008 | Lisitsa et al. |
| 7,362,738 B2 | 4/2008 | Taube et al. |
| 7,376,556 B2 | 5/2008 | Bennett |
| 7,376,632 B1 | 5/2008 | Sadek et al. |
| 7,376,645 B2 | 5/2008 | Bernard |
| 7,379,874 B2 | 5/2008 | Schmid et al. |
| 7,380,203 B2 | 5/2008 | Keely et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,460,652 B2 | 12/2008 | Chang |
| 7,467,087 B1 | 12/2008 | Gillick et al. |
| 7,475,010 B2 | 1/2009 | Chao |
| 7,478,037 B2 | 1/2009 | Strong |
| 7,483,832 B2 | 1/2009 | Tischer |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,528,713 B2 | 5/2009 | Singh et al. |
| 7,529,671 B2 | 5/2009 | Rockenbeck et al. |
| 7,529,676 B2 | 5/2009 | Koyama |
| 7,536,565 B2 | 5/2009 | Girish et al. |
| 7,539,656 B2 | 5/2009 | Fratkina et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,559,026 B2 | 7/2009 | Girish et al. |
| 7,561,069 B2 | 7/2009 | Horstemeyer |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,599,918 B2 | 10/2009 | Shen et al. |
| 7,603,381 B2 | 10/2009 | Burke et al. |
| 7,613,264 B2 | 11/2009 | Wells et al. |
| 7,617,094 B2 | 11/2009 | Aoki et al. |
| 7,620,549 B2 | 11/2009 | Di Cristo et al. |
| 7,624,007 B2 | 11/2009 | Bennett |
| 7,627,481 B1 | 12/2009 | Kuo et al. |
| 7,630,901 B2 | 12/2009 | Omi |
| 7,634,409 B2 | 12/2009 | Kennewick et al. |
| 7,634,413 B1 | 12/2009 | Kuo et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,649,454 B2 | 1/2010 | Singh et al. |
| 7,657,424 B2 | 2/2010 | Bennett |
| 7,664,558 B2 | 2/2010 | Lindahl et al. |
| 7,664,638 B2 | 2/2010 | Cooper et al. |
| 7,672,841 B2 | 3/2010 | Bennett |
| 7,673,238 B2 | 3/2010 | Girish et al. |
| 7,676,026 B1 | 3/2010 | Baxter, Jr. |
| 7,684,985 B2 | 3/2010 | Dominach et al. |
| 7,684,990 B2 | 3/2010 | Caskey et al. |
| 7,693,715 B2 | 4/2010 | Hwang et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,129 B2 | 5/2010 | Lindahl et al. |

(56) References Cited

U.S. PATENT DOCUMENTS

| | | |
|---|---|---|
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,778,632 B2 | 8/2010 | Kurlander et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,818,291 B2 | 10/2010 | Ferguson et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,444 B2 | 12/2010 | Wang et al. |
| 7,853,574 B2 | 12/2010 | Kraenzel et al. |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longe et al. |
| 7,885,844 B1 | 2/2011 | Cohen et al. |
| 7,890,652 B2 | 2/2011 | Bull et al. |
| 7,899,666 B2 | 3/2011 | Varone |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,930,168 B2 | 4/2011 | Weng et al. |
| 7,930,197 B2 | 4/2011 | Ozzie et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,015,006 B2 | 9/2011 | Kennewick et al. |
| 8,015,144 B2 | 9/2011 | Zheng et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,050,500 B1 | 11/2011 | Batty et al. |
| 8,055,502 B2 | 11/2011 | Clark et al. |
| 8,055,708 B2 | 11/2011 | Chitsaz et al. |
| 8,065,143 B2 | 11/2011 | Yanagihara |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longe et al. |
| 8,099,289 B2 | 1/2012 | Mozer et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,122,353 B2 | 2/2012 | Bouta |
| 8,131,557 B2 | 3/2012 | Davis et al. |
| 8,138,912 B2 | 3/2012 | Singh et al. |
| 8,140,335 B2 | 3/2012 | Kennewick et al. |
| 8,150,700 B2 | 4/2012 | Shin et al. |
| 8,165,886 B1 | 4/2012 | Gagnon et al. |
| 8,166,019 B1 | 4/2012 | Lee et al. |
| 8,170,790 B2 | 5/2012 | Lee et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,239,207 B2 | 8/2012 | Seligman et al. |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,406,745 B1* | 3/2013 | Upadhyay ............ H04L 51/066 379/88.11 |
| 8,447,612 B2 | 5/2013 | Gazdzinski |
| 8,498,857 B2 | 7/2013 | Kopparapu et al. |
| 2001/0029455 A1 | 10/2001 | Chin et al. |
| 2001/0030660 A1 | 10/2001 | Zainoulline |
| 2001/0047264 A1 | 11/2001 | Roundtree |
| 2002/0002039 A1 | 1/2002 | Qureshey et al. |
| 2002/0002461 A1 | 1/2002 | Tetsumoto |
| 2002/0004703 A1 | 1/2002 | Gaspard, II |
| 2002/0010584 A1 | 1/2002 | Schultz et al. |
| 2002/0013852 A1 | 1/2002 | Janik |
| 2002/0031262 A1 | 3/2002 | Imagawa et al. |
| 2002/0032564 A1 | 3/2002 | Ehsani et al. |
| 2002/0032751 A1 | 3/2002 | Bharadwaj |
| 2002/0035474 A1 | 3/2002 | Alpdemir |
| 2002/0042707 A1 | 4/2002 | Zhao et al. |
| 2002/0045438 A1 | 4/2002 | Tagawa et al. |
| 2002/0046025 A1 | 4/2002 | Hain |
| 2002/0046315 A1 | 4/2002 | Miller et al. |
| 2002/0052747 A1 | 5/2002 | Sarukkai |
| 2002/0059068 A1 | 5/2002 | Rose et al. |
| 2002/0067308 A1 | 6/2002 | Robertson |
| 2002/0069063 A1 | 6/2002 | Buchner et al. |
| 2002/0072816 A1 | 6/2002 | Shdema et al. |
| 2002/0077817 A1 | 6/2002 | Atal |
| 2002/0080163 A1 | 6/2002 | Morey |
| 2002/0099552 A1 | 7/2002 | Rubin et al. |
| 2002/0103641 A1 | 8/2002 | Kuo et al. |
| 2002/0107684 A1 | 8/2002 | Gao |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0128827 A1 | 9/2002 | Bu et al. |

(56) References Cited

U.S. PATENT DOCUMENTS

| | | |
|---|---|---|
| 2002/0133347 A1 | 9/2002 | Schoneburg et al. |
| 2002/0135565 A1 | 9/2002 | Gordon et al. |
| 2002/0138265 A1 | 9/2002 | Stevens et al. |
| 2002/0143533 A1 | 10/2002 | Lucas et al. |
| 2002/0143551 A1 | 10/2002 | Sharma et al. |
| 2002/0151297 A1 | 10/2002 | Remboski et al. |
| 2002/0154160 A1 | 10/2002 | Hosokawa |
| 2002/0164000 A1 | 11/2002 | Cohen et al. |
| 2002/0169605 A1 | 11/2002 | Damiba et al. |
| 2002/0173889 A1 | 11/2002 | Odinak et al. |
| 2002/0184189 A1 | 12/2002 | Hay et al. |
| 2002/0198714 A1 | 12/2002 | Zhou |
| 2003/0001881 A1 | 1/2003 | Mannheimer et al. |
| 2003/0016770 A1 | 1/2003 | Trans et al. |
| 2003/0020760 A1 | 1/2003 | Takatsu et al. |
| 2003/0026392 A1* | 2/2003 | Brown ............. H04M 3/42221 379/88.13 |
| 2003/0033153 A1 | 2/2003 | Olson et al. |
| 2003/0046401 A1 | 3/2003 | Abbott et al. |
| 2003/0074198 A1 | 4/2003 | Sussman |
| 2003/0078766 A1 | 4/2003 | Appelt et al. |
| 2003/0079038 A1 | 4/2003 | Robbin et al. |
| 2003/0083884 A1 | 5/2003 | Odinak et al. |
| 2003/0088414 A1 | 5/2003 | Huang et al. |
| 2003/0097210 A1 | 5/2003 | Horst et al. |
| 2003/0098892 A1 | 5/2003 | Hiipakka |
| 2003/0099335 A1 | 5/2003 | Tanaka et al. |
| 2003/0101045 A1 | 5/2003 | Moffatt et al. |
| 2003/0115060 A1 | 6/2003 | Junqua et al. |
| 2003/0115064 A1 | 6/2003 | Gusler et al. |
| 2003/0115552 A1 | 6/2003 | Jahnke et al. |
| 2003/0117365 A1 | 6/2003 | Shteyn |
| 2003/0120494 A1 | 6/2003 | Jost et al. |
| 2003/0125927 A1 | 7/2003 | Seme |
| 2003/0126559 A1 | 7/2003 | Fuhrmann |
| 2003/0135740 A1 | 7/2003 | Talmor et al. |
| 2003/0144846 A1 | 7/2003 | Denenberg et al. |
| 2003/0157968 A1 | 8/2003 | Boman et al. |
| 2003/0158737 A1 | 8/2003 | Csicsatka |
| 2003/0167318 A1 | 9/2003 | Robbin et al. |
| 2003/0167335 A1 | 9/2003 | Alexander |
| 2003/0190074 A1 | 10/2003 | Loudon et al. |
| 2003/0197744 A1 | 10/2003 | Irvine |
| 2003/0212961 A1 | 11/2003 | Soin et al. |
| 2003/0233230 A1 | 12/2003 | Ammicht et al. |
| 2003/0233237 A1 | 12/2003 | Garside et al. |
| 2003/0234824 A1 | 12/2003 | Litwiller |
| 2004/0051729 A1 | 3/2004 | Borden, IV |
| 2004/0052338 A1 | 3/2004 | Celi, Jr. et al. |
| 2004/0054535 A1 | 3/2004 | Mackie et al. |
| 2004/0054690 A1 | 3/2004 | Hillerbrand et al. |
| 2004/0055446 A1 | 3/2004 | Robbin et al. |
| 2004/0061717 A1 | 4/2004 | Menon et al. |
| 2004/0085162 A1 | 5/2004 | Agarwal et al. |
| 2004/0114731 A1 | 6/2004 | Gillett et al. |
| 2004/0127241 A1 | 7/2004 | Shostak |
| 2004/0135701 A1 | 7/2004 | Yasuda et al. |
| 2004/0145607 A1 | 7/2004 | Alderson |
| 2004/0162741 A1 | 8/2004 | Flaxer et al. |
| 2004/0176958 A1 | 9/2004 | Salmenkaita et al. |
| 2004/0186714 A1 | 9/2004 | Baker |
| 2004/0193420 A1 | 9/2004 | Kennewick et al. |
| 2004/0193426 A1 | 9/2004 | Maddux et al. |
| 2004/0199375 A1 | 10/2004 | Ehsani et al. |
| 2004/0199387 A1 | 10/2004 | Wang et al. |
| 2004/0205671 A1 | 10/2004 | Sukehiro et al. |
| 2004/0218451 A1 | 11/2004 | Said et al. |
| 2004/0220798 A1 | 11/2004 | Chi et al. |
| 2004/0225746 A1 | 11/2004 | Niell et al. |
| 2004/0236778 A1 | 11/2004 | Junqua et al. |
| 2004/0243419 A1 | 12/2004 | Wang |
| 2004/0257432 A1 | 12/2004 | Girish et al. |
| 2005/0002507 A1 | 1/2005 | Timmins et al. |
| 2005/0015254 A1 | 1/2005 | Beaman |
| 2005/0015772 A1 | 1/2005 | Saare et al. |
| 2005/0033582 A1 | 2/2005 | Gadd et al. |
| 2005/0045373 A1 | 3/2005 | Born |
| 2005/0049880 A1 | 3/2005 | Roth et al. |
| 2005/0055403 A1 | 3/2005 | Brittan |
| 2005/0058438 A1 | 3/2005 | Hayashi |
| 2005/0071332 A1 | 3/2005 | Ortega et al. |
| 2005/0080625 A1 | 4/2005 | Bennett et al. |
| 2005/0080780 A1 | 4/2005 | Colledge et al. |
| 2005/0086059 A1 | 4/2005 | Bennett |
| 2005/0091118 A1 | 4/2005 | Fano |
| 2005/0100214 A1 | 5/2005 | Zhang et al. |
| 2005/0102614 A1 | 5/2005 | Brockett et al. |
| 2005/0102625 A1 | 5/2005 | Lee et al. |
| 2005/0108001 A1 | 5/2005 | Aarskog |
| 2005/0108074 A1 | 5/2005 | Bloechl et al. |
| 2005/0108338 A1 | 5/2005 | Simske et al. |
| 2005/0114124 A1 | 5/2005 | Liu et al. |
| 2005/0114140 A1 | 5/2005 | Brackett et al. |
| 2005/0119897 A1 | 6/2005 | Bennett et al. |
| 2005/0125216 A1 | 6/2005 | Chitrapura et al. |
| 2005/0125235 A1 | 6/2005 | Lazay et al. |
| 2005/0132301 A1 | 6/2005 | Ikeda |
| 2005/0143972 A1 | 6/2005 | Gopalakrishnan et al. |
| 2005/0149332 A1 | 7/2005 | Kuzunuki et al. |
| 2005/0152602 A1 | 7/2005 | Chen et al. |
| 2005/0165607 A1 | 7/2005 | Di Fabbrizio et al. |
| 2005/0182616 A1 | 8/2005 | Kotipalli |
| 2005/0182628 A1 | 8/2005 | Choi |
| 2005/0182629 A1 | 8/2005 | Coorman et al. |
| 2005/0192801 A1 | 9/2005 | Lewis et al. |
| 2005/0196733 A1 | 9/2005 | Budra et al. |
| 2005/0201572 A1 | 9/2005 | Lindahl et al. |
| 2005/0203747 A1 | 9/2005 | Lecoeuche |
| 2005/0203991 A1 | 9/2005 | Kawamura et al. |
| 2005/0222843 A1 | 10/2005 | Kahn et al. |
| 2005/0228665 A1 | 10/2005 | Kobayashi et al. |
| 2005/0273626 A1 | 12/2005 | Pearson et al. |
| 2005/0283364 A1 | 12/2005 | Longe et al. |
| 2005/0288934 A1 | 12/2005 | Omi |
| 2005/0288936 A1 | 12/2005 | Busayapongchai et al. |
| 2005/0289463 A1 | 12/2005 | Wu et al. |
| 2006/0009973 A1 | 1/2006 | Nguyen et al. |
| 2006/0018492 A1 | 1/2006 | Chiu et al. |
| 2006/0061488 A1 | 3/2006 | Dunton |
| 2006/0067535 A1 | 3/2006 | Culbert et al. |
| 2006/0067536 A1 | 3/2006 | Culbert et al. |
| 2006/0074660 A1 | 4/2006 | Waters et al. |
| 2006/0077055 A1 | 4/2006 | Basir |
| 2006/0095846 A1 | 5/2006 | Nurmi |
| 2006/0095848 A1 | 5/2006 | Naik |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1 | 5/2006 | Cross et al. |
| 2006/0116874 A1 | 6/2006 | Samuelsson et al. |
| 2006/0117002 A1 | 6/2006 | Swen |
| 2006/0119582 A1 | 6/2006 | Ng et al. |
| 2006/0122834 A1 | 6/2006 | Bennett |
| 2006/0122836 A1 | 6/2006 | Cross et al. |
| 2006/0143007 A1 | 6/2006 | Koh et al. |
| 2006/0143576 A1 | 6/2006 | Gupta et al. |
| 2006/0153040 A1 | 7/2006 | Girish et al. |
| 2006/0156252 A1 | 7/2006 | Sheshagiri et al. |
| 2006/0190269 A1 | 8/2006 | Tessel et al. |
| 2006/0193518 A1 | 8/2006 | Dong |
| 2006/0200253 A1 | 9/2006 | Hoffberg et al. |
| 2006/0200342 A1 | 9/2006 | Corston-Oliver et al. |
| 2006/0217967 A1 | 9/2006 | Goertzen et al. |
| 2006/0221788 A1 | 10/2006 | Lindahl et al. |
| 2006/0235700 A1 | 10/2006 | Wong et al. |
| 2006/0239471 A1 | 10/2006 | Mao et al. |
| 2006/0242190 A1 | 10/2006 | Wnek |
| 2006/0262876 A1 | 11/2006 | LaDue |
| 2006/0274051 A1 | 12/2006 | Longe et al. |
| 2006/0274905 A1 | 12/2006 | Lindahl et al. |
| 2006/0277058 A1 | 12/2006 | J"maev et al. |
| 2006/0282264 A1 | 12/2006 | Denny et al. |
| 2006/0293876 A1 | 12/2006 | Kamatani et al. |
| 2006/0293886 A1 | 12/2006 | Odell et al. |

(56) References Cited

U.S. PATENT DOCUMENTS

| | | |
|---|---|---|
| 2007/0006098 A1 | 1/2007 | Krumm et al. |
| 2007/0021956 A1 | 1/2007 | Qu et al. |
| 2007/0027732 A1 | 2/2007 | Hudgens |
| 2007/0033003 A1 | 2/2007 | Morris |
| 2007/0038436 A1 | 2/2007 | Cristoe et al. |
| 2007/0038609 A1 | 2/2007 | Wu |
| 2007/0041361 A1 | 2/2007 | Iso-Sipila |
| 2007/0043568 A1 | 2/2007 | Dhanakshirur et al. |
| 2007/0044038 A1 | 2/2007 | Horentrup et al. |
| 2007/0047719 A1 | 3/2007 | Dhawan et al. |
| 2007/0050191 A1 | 3/2007 | Weider et al. |
| 2007/0050712 A1 | 3/2007 | Hull et al. |
| 2007/0052586 A1 | 3/2007 | Horstemeyer |
| 2007/0055514 A1 | 3/2007 | Beattie et al. |
| 2007/0055525 A1 | 3/2007 | Kennewick et al. |
| 2007/0055529 A1 | 3/2007 | Kanevsky et al. |
| 2007/0058832 A1 | 3/2007 | Hug et al. |
| 2007/0073540 A1 | 3/2007 | Hirakawa et al. |
| 2007/0083467 A1 | 4/2007 | Lindahl et al. |
| 2007/0088556 A1 | 4/2007 | Andrew |
| 2007/0094026 A1 | 4/2007 | Ativanichayaphong et al. |
| 2007/0100635 A1 | 5/2007 | Mahajan et al. |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0118378 A1 | 5/2007 | Skuratovsky |
| 2007/0124149 A1 | 5/2007 | Shen et al. |
| 2007/0135949 A1 | 6/2007 | Snover et al. |
| 2007/0157268 A1 | 7/2007 | Girish et al. |
| 2007/0174188 A1 | 7/2007 | Fish |
| 2007/0180383 A1 | 8/2007 | Naik |
| 2007/0182595 A1 | 8/2007 | Ghasabian |
| 2007/0185754 A1 | 8/2007 | Schmidt |
| 2007/0185917 A1 | 8/2007 | Prahlad et al. |
| 2007/0198269 A1 | 8/2007 | Braho et al. |
| 2007/0208569 A1 | 9/2007 | Subramanian et al. |
| 2007/0208579 A1 | 9/2007 | Peterson |
| 2007/0208726 A1 | 9/2007 | Krishnaprasad et al. |
| 2007/0211071 A1 | 9/2007 | Slotznick et al. |
| 2007/0225980 A1 | 9/2007 | Sumita |
| 2007/0239429 A1 | 10/2007 | Johnson et al. |
| 2007/0265831 A1 | 11/2007 | Dinur et al. |
| 2007/0276651 A1 | 11/2007 | Bliss et al. |
| 2007/0276714 A1 | 11/2007 | Beringer |
| 2007/0276810 A1 | 11/2007 | Rosen |
| 2007/0282595 A1 | 12/2007 | Tunning et al. |
| 2007/0286399 A1* | 12/2007 | Ramamoorthy .......................... H04M 1/274516 379/355.02 |
| 2007/0288241 A1 | 12/2007 | Cross et al. |
| 2007/0291108 A1 | 12/2007 | Huber et al. |
| 2007/0294263 A1 | 12/2007 | Punj et al. |
| 2007/0299664 A1 | 12/2007 | Peters et al. |
| 2008/0012950 A1 | 1/2008 | Lee et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0040339 A1 | 2/2008 | Zhou et al. |
| 2008/0042970 A1 | 2/2008 | Liang et al. |
| 2008/0048908 A1 | 2/2008 | Sato |
| 2008/0052063 A1 | 2/2008 | Bennett et al. |
| 2008/0052073 A1 | 2/2008 | Goto et al. |
| 2008/0056579 A1 | 3/2008 | Guha |
| 2008/0071544 A1 | 3/2008 | Beaufays et al. |
| 2008/0075296 A1 | 3/2008 | Lindahl et al. |
| 2008/0077384 A1 | 3/2008 | Agapi et al. |
| 2008/0077406 A1 | 3/2008 | Ganong |
| 2008/0079566 A1 | 4/2008 | Singh et al. |
| 2008/0082332 A1 | 4/2008 | Mallett et al. |
| 2008/0082338 A1 | 4/2008 | O'Neil et al. |
| 2008/0082390 A1 | 4/2008 | Hawkins et al. |
| 2008/0082651 A1 | 4/2008 | Singh et al. |
| 2008/0091406 A1 | 4/2008 | Baldwin et al. |
| 2008/0109222 A1 | 5/2008 | Liu |
| 2008/0118143 A1 | 5/2008 | Gordon et al. |
| 2008/0120102 A1 | 5/2008 | Rao |
| 2008/0120112 A1 | 5/2008 | Bennett et al. |
| 2008/0120342 A1 | 5/2008 | Reed et al. |
| 2008/0126100 A1 | 5/2008 | Grost et al. |
| 2008/0129520 A1 | 6/2008 | Lee |
| 2008/0131006 A1 | 6/2008 | Oliver |
| 2008/0133215 A1 | 6/2008 | Sarukkai |
| 2008/0133228 A1 | 6/2008 | Rao |
| 2008/0140413 A1 | 6/2008 | Millman et al. |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0154612 A1 | 6/2008 | Evermann et al. |
| 2008/0157867 A1 | 7/2008 | Krah |
| 2008/0165980 A1 | 7/2008 | Pavlovic et al. |
| 2008/0189106 A1 | 8/2008 | Low et al. |
| 2008/0189114 A1 | 8/2008 | Fail et al. |
| 2008/0208585 A1 | 8/2008 | Ativanichayaphong et al. |
| 2008/0208587 A1 | 8/2008 | Ben-David et al. |
| 2008/0221866 A1 | 9/2008 | Katragadda et al. |
| 2008/0221880 A1 | 9/2008 | Cerra et al. |
| 2008/0221889 A1 | 9/2008 | Cerra et al. |
| 2008/0221903 A1 | 9/2008 | Kanevsky et al. |
| 2008/0228463 A1 | 9/2008 | Mori et al. |
| 2008/0228490 A1 | 9/2008 | Fischer et al. |
| 2008/0228496 A1 | 9/2008 | Yu et al. |
| 2008/0240569 A1 | 10/2008 | Tonouchi |
| 2008/0247519 A1 | 10/2008 | Abella et al. |
| 2008/0249770 A1 | 10/2008 | Kim et al. |
| 2008/0253577 A1 | 10/2008 | Eppolito |
| 2008/0255845 A1 | 10/2008 | Bennett |
| 2008/0256613 A1 | 10/2008 | Grover |
| 2008/0270118 A1 | 10/2008 | Kuo et al. |
| 2008/0281510 A1 | 11/2008 | Shahine |
| 2008/0300878 A1 | 12/2008 | Bennett |
| 2008/0313335 A1 | 12/2008 | Jung et al. |
| 2008/0319763 A1 | 12/2008 | Di Fabbrizio et al. |
| 2009/0003115 A1 | 1/2009 | Lindahl et al. |
| 2009/0005891 A1 | 1/2009 | Batson et al. |
| 2009/0006100 A1 | 1/2009 | Badger et al. |
| 2009/0006343 A1 | 1/2009 | Platt et al. |
| 2009/0006488 A1 | 1/2009 | Lindahl et al. |
| 2009/0006671 A1 | 1/2009 | Batson et al. |
| 2009/0011709 A1 | 1/2009 | Akasaka et al. |
| 2009/0012775 A1 | 1/2009 | El Hady et al. |
| 2009/0018835 A1 | 1/2009 | Cooper et al. |
| 2009/0022329 A1 | 1/2009 | Mahowald |
| 2009/0028435 A1 | 1/2009 | Wu et al. |
| 2009/0030800 A1 | 1/2009 | Grois |
| 2009/0048845 A1 | 2/2009 | Burckart et al. |
| 2009/0055179 A1 | 2/2009 | Cho et al. |
| 2009/0058823 A1 | 3/2009 | Kocienda |
| 2009/0060472 A1 | 3/2009 | Bull et al. |
| 2009/0070097 A1 | 3/2009 | Wu et al. |
| 2009/0076792 A1 | 3/2009 | Lawson-Tancred |
| 2009/0076796 A1 | 3/2009 | Daraselia |
| 2009/0077165 A1 | 3/2009 | Rhodes et al. |
| 2009/0083047 A1 | 3/2009 | Lindahl et al. |
| 2009/0092239 A1* | 4/2009 | MacWan ............... G10L 15/265 379/201.01 |
| 2009/0092260 A1 | 4/2009 | Powers |
| 2009/0092261 A1 | 4/2009 | Bard |
| 2009/0092262 A1 | 4/2009 | Costa et al. |
| 2009/0094033 A1 | 4/2009 | Mozer et al. |
| 2009/0100049 A1 | 4/2009 | Cao |
| 2009/0106026 A1 | 4/2009 | Ferrieux |
| 2009/0112572 A1 | 4/2009 | Thorn |
| 2009/0112677 A1 | 4/2009 | Rhett |
| 2009/0112892 A1 | 4/2009 | Cardie et al. |
| 2009/0123071 A1 | 5/2009 | Iwasaki |
| 2009/0125477 A1 | 5/2009 | Lu et al. |
| 2009/0144049 A1 | 6/2009 | Haddad et al. |
| 2009/0146848 A1 | 6/2009 | Ghassabian |
| 2009/0150156 A1 | 6/2009 | Kennewick et al. |
| 2009/0154669 A1 | 6/2009 | Wood et al. |
| 2009/0157401 A1 | 6/2009 | Bennett |
| 2009/0164441 A1 | 6/2009 | Cheyer |
| 2009/0164655 A1 | 6/2009 | Pettersson et al. |
| 2009/0167508 A1 | 7/2009 | Fadell et al. |

(56) References Cited

U.S. PATENT DOCUMENTS

| | | |
|---|---|---|
| 2009/0167509 A1 | 7/2009 | Fadell et al. |
| 2009/0171664 A1 | 7/2009 | Kennewick et al. |
| 2009/0172542 A1 | 7/2009 | Girish et al. |
| 2009/0177461 A1 | 7/2009 | Ehsani et al. |
| 2009/0182445 A1 | 7/2009 | Girish et al. |
| 2009/0187577 A1 | 7/2009 | Reznik et al. |
| 2009/0191895 A1 | 7/2009 | Singh et al. |
| 2009/0192782 A1 | 7/2009 | Drewes |
| 2009/0204409 A1 | 8/2009 | Mozer et al. |
| 2009/0216704 A1 | 8/2009 | Zheng et al. |
| 2009/0222488 A1 | 9/2009 | Boerries et al. |
| 2009/0228273 A1 | 9/2009 | Wang et al. |
| 2009/0234655 A1 | 9/2009 | Kwon |
| 2009/0239552 A1 | 9/2009 | Churchill et al. |
| 2009/0248182 A1 | 10/2009 | Logan et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0271109 A1 | 10/2009 | Lee et al. |
| 2009/0271175 A1 | 10/2009 | Bodin et al. |
| 2009/0271178 A1 | 10/2009 | Bodin et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0306967 A1 | 12/2009 | Nicolov et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306989 A1 | 12/2009 | Kaji |
| 2009/0307162 A1 | 12/2009 | Bui et al. |
| 2009/0313026 A1 | 12/2009 | Coffman et al. |
| 2009/0319266 A1 | 12/2009 | Brown et al. |
| 2009/0326936 A1 | 12/2009 | Nagashima |
| 2009/0326938 A1 | 12/2009 | Marila et al. |
| 2010/0005081 A1 | 1/2010 | Bennett |
| 2010/0023320 A1 | 1/2010 | Di Cristo et al. |
| 2010/0030928 A1 | 2/2010 | Conroy et al. |
| 2010/0031143 A1 | 2/2010 | Rao et al. |
| 2010/0036660 A1 | 2/2010 | Bennett |
| 2010/0042400 A1 | 2/2010 | Block et al. |
| 2010/0049514 A1 | 2/2010 | Kennewick et al. |
| 2010/0057457 A1 | 3/2010 | Ogata et al. |
| 2010/0060646 A1 | 3/2010 | Unsal et al. |
| 2010/0063825 A1 | 3/2010 | Williams et al. |
| 2010/0064113 A1 | 3/2010 | Lindahl et al. |
| 2010/0070899 A1 | 3/2010 | Hunt et al. |
| 2010/0076760 A1 | 3/2010 | Kraenzel et al. |
| 2010/0081456 A1 | 4/2010 | Singh et al. |
| 2010/0081487 A1 | 4/2010 | Chen et al. |
| 2010/0082970 A1 | 4/2010 | Lindahl et al. |
| 2010/0088020 A1 | 4/2010 | Sano et al. |
| 2010/0088100 A1 | 4/2010 | Lindahl |
| 2010/0100212 A1 | 4/2010 | Lindahl et al. |
| 2010/0100384 A1 | 4/2010 | Ju et al. |
| 2010/0106500 A1 | 4/2010 | McKee et al. |
| 2010/0125460 A1 | 5/2010 | Mellott et al. |
| 2010/0131273 A1 | 5/2010 | Aley-Raz et al. |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0145694 A1 | 6/2010 | Ju et al. |
| 2010/0145700 A1 | 6/2010 | Kennewick et al. |
| 2010/0146442 A1 | 6/2010 | Nagasaka et al. |
| 2010/0161554 A1 | 6/2010 | Datuashvili et al. |
| 2010/0185448 A1 | 7/2010 | Meisel |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0231474 A1 | 9/2010 | Yamagajo et al. |
| 2010/0235341 A1 | 9/2010 | Bennett |
| 2010/0257160 A1 | 10/2010 | Cao |
| 2010/0257478 A1 | 10/2010 | Longe et al. |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0286985 A1 | 11/2010 | Kennewick et al. |
| 2010/0299133 A1 | 11/2010 | Kopparapu et al. |
| 2010/0299142 A1 | 11/2010 | Freeman et al. |
| 2010/0312547 A1 | 12/2010 | Van Os et al. |
| 2010/0312566 A1 | 12/2010 | Odinak et al. |
| 2010/0318576 A1 | 12/2010 | Kim |
| 2010/0324905 A1 | 12/2010 | Kurzweil et al. |
| 2010/0332235 A1 | 12/2010 | David |
| 2010/0332280 A1 | 12/2010 | Bradley et al. |
| 2010/0332348 A1 | 12/2010 | Cao |
| 2011/0010178 A1 | 1/2011 | Lee et al. |
| 2011/0022952 A1 | 1/2011 | Wu et al. |
| 2011/0047072 A1 | 2/2011 | Ciurea |
| 2011/0054901 A1 | 3/2011 | Qin et al. |
| 2011/0060584 A1 | 3/2011 | Ferrucci et al. |
| 2011/0060807 A1 | 3/2011 | Martin et al. |
| 2011/0076994 A1 | 3/2011 | Kim et al. |
| 2011/0082688 A1 | 4/2011 | Kim et al. |
| 2011/0090078 A1 | 4/2011 | Kim et al. |
| 2011/0099000 A1 | 4/2011 | Rai et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Dicristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184721 A1 | 7/2011 | Subramanian et al. |
| 2011/0184730 A1 | 7/2011 | LeBeau et al. |
| 2011/0195758 A1 | 8/2011 | Damale et al. |
| 2011/0201387 A1 | 8/2011 | Paek et al. |
| 2011/0218855 A1 | 9/2011 | Cao et al. |
| 2011/0224972 A1 | 9/2011 | Millett et al. |
| 2011/0228913 A1* | 9/2011 | Cochinwala ...... H04M 3/42221 379/85 |
| 2011/0231182 A1 | 9/2011 | Weider et al. |
| 2011/0231188 A1 | 9/2011 | Kennewick et al. |
| 2011/0231474 A1 | 9/2011 | Locker et al. |
| 2011/0260861 A1 | 10/2011 | Singh et al. |
| 2011/0264643 A1 | 10/2011 | Cao |
| 2011/0279368 A1 | 11/2011 | Klein et al. |
| 2011/0288861 A1 | 11/2011 | Kurzweil et al. |
| 2011/0298585 A1 | 12/2011 | Barry |
| 2011/0306426 A1 | 12/2011 | Novak et al. |
| 2011/0314404 A1 | 12/2011 | Kotler et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | Lebeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0078627 A1 | 3/2012 | Wagner |
| 2012/0084086 A1 | 4/2012 | Gilbert et al. |
| 2012/0108221 A1 | 5/2012 | Thomas et al. |
| 2012/0136572 A1 | 5/2012 | Norton |
| 2012/0137367 A1 | 5/2012 | Dupont et al. |
| 2012/0149394 A1 | 6/2012 | Singh et al. |

(56) References Cited

U.S. PATENT DOCUMENTS

| | | |
|---|---|---|
| 2012/0150580 A1 | 6/2012 | Norton |
| 2012/0173464 A1 | 7/2012 | Tur et al. |
| 2012/0185237 A1 | 7/2012 | Gajic et al. |
| 2012/0197998 A1 | 8/2012 | Kessel et al. |
| 2012/0214517 A1 | 8/2012 | Singh et al. |
| 2012/0221339 A1 | 8/2012 | Wang et al. |
| 2012/0245719 A1 | 9/2012 | Story, Jr. et al. |
| 2012/0245944 A1 | 9/2012 | Gruber et al. |
| 2012/0265528 A1 | 10/2012 | Gruber et al. |
| 2012/0271625 A1 | 10/2012 | Bernard |
| 2012/0271635 A1 | 10/2012 | Ljolje |
| 2012/0271676 A1 | 10/2012 | Aravamudan et al. |
| 2012/0284027 A1 | 11/2012 | Mallett et al. |
| 2012/0296649 A1 | 11/2012 | Bansal et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0330661 A1 | 12/2012 | Lindahl |
| 2013/0006638 A1 | 1/2013 | Lindahl |
| 2013/0007648 A1* | 1/2013 | Gamon ............... G06Q 10/109 715/771 |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0115927 A1 | 5/2013 | Gruber et al. |
| 2013/0117022 A1 | 5/2013 | Chen et al. |
| 2013/0185074 A1 | 7/2013 | Gruber et al. |
| 2013/0185081 A1 | 7/2013 | Cheyer et al. |
| 2013/0325443 A1 | 12/2013 | Begeja et al. |

FOREIGN PATENT DOCUMENTS

| | | |
|---|---|---|
| DE | 3837590 A1 | 5/1990 |
| DE | 19841541 B4 | 12/2007 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0558312 A1 | 9/1993 |
| EP | 0559349 A1 | 9/1993 |
| EP | 0570660 A1 | 11/1993 |
| EP | 0863453 A1 | 9/1998 |
| EP | 0559349 B1 | 1/1999 |
| EP | 0981236 A1 | 2/2000 |
| EP | 1229496 A2 | 8/2002 |
| EP | 1245023 A1 | 10/2002 |
| EP | 1311102 A1 | 5/2003 |
| EP | 1315084 A1 | 5/2003 |
| EP | 1315086 A1 | 5/2003 |
| EP | 2109295 A1 | 10/2009 |
| GB | 2293667 A | 4/1996 |
| JP | 60-19965 A | 1/1994 |
| JP | 7-199379 A | 8/1995 |
| JP | 11-6743 A | 1/1999 |
| JP | 2001-125896 A | 5/2001 |
| JP | 2002-14954 A | 1/2002 |
| JP | 2002-24212 A | 1/2002 |
| JP | 2003-517158 A | 5/2003 |
| JP | 2004-152063 A | 5/2004 |
| JP | 2007-4633 A | 1/2007 |
| JP | 2008-236448 A | 10/2008 |
| JP | 2008-271481 A | 11/2008 |
| JP | 2009-36999 A | 2/2009 |
| JP | 2009-294913 A | 12/2009 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| NL | 1014847 C1 | 10/2001 |
| WO | 1995/002221 A1 | 1/1995 |
| WO | 1997/010586 A1 | 3/1997 |
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/029964 A1 | 5/2000 |
| WO | 2000/060435 A2 | 10/2000 |
| WO | 2000/060435 A3 | 4/2001 |
| WO | 2001/035391 A1 | 5/2001 |
| WO | 2002/073603 A1 | 9/2002 |
| WO | 20041008801 A1 | 1/2004 |
| WO | 2006/129967 A1 | 12/2006 |
| WO | 2007/080559 A2 | 7/2007 |
| WO | 2008/085742 A2 | 7/2008 |
| WO | 2008/109835 A2 | 9/2008 |
| WO | 2010/075623 A1 | 7/2010 |
| WO | 2011/088053 A2 | 7/2011 |
| WO | 2011/133543 A1 | 10/2011 |
| WO | 2012/167168 A2 | 12/2012 |

OTHER PUBLICATIONS

International Search Report and Written Opinion received for PCT Patent Application No. PCT/US2012/040571, dated Nov. 16, 2012, 14 pages.
Extended European Search Report and Search Opinion received for European Patent Application No. 12185276.8, dated Dec. 18, 2012, 4 pages.
Extended European Search Report received for European Patent Application No. 12186663.6, dated Jul. 16, 2013, 6 pages.
"Top 10 Best Practices for Voice User Interface Design" available at <http://www.developer.com/voice/article.php/1567051/Top-10-Best-Practices-for-Voice-UserInterface-Design.htm>, Nov. 1, 2002, 4 pages.
Apple Computer, "Knowledge Navigator", published by Apple Computer no later than 2008, as depicted in "Exemplary Screenshots from video entitled "Knowledge Navigator"", 2008, 7 pages.
Bellegarda, Jerome R., "Latent Semantic Mapping", IEEE Signal Processing Magazine, vol. 22, No. 5, Sep. 2005, pp. 70-80.
Car Working Group, "Hands-Free Profile 1.5 HFP1.5_SPEC", Bluetooth Doc, available at <www.bluetooth.org>, Nov. 25, 2005, 93 pages.
Cohen et al., "Voice User Interface Design,", Excerpts from Chapter 1 and Chapter 10, 2004, 36 pages.
"Mel Scale", Wikipedia the Free Encyclopedia, Last modified on Oct. 13, 2009 Available and retrieved on Jul. 28, 2010, online at <http://en.wikipedia.org/wiki/Mel_scale>, 2 pages.
"Minimum Phase", Wikipedia the free Encyclopedia, Last modified on Jan. 12, 2010 and retrieved on Jul. 28, 2010, Available online at <http://en.wikipedia.org/wiki/Minimum_phase>, 8 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Acero et al., "Environmental Robustness in Automatic Speech Recognition", International Conference on Acoustics, Speech and Signal Processing (ICASSP'90), Apr. 1990, 4 pages.
Acero et al., "Robust Speech Recognition by Normalization of the Acoustic Space", International Conference on Acoustics, Speech and Signal Processing, 1991, 4 pages.

(56) References Cited

OTHER PUBLICATIONS

Agnas et al., "Spoken Language Translator: First-Year Report", SICS (ISSN 0283-3638), SRI and Telia Research AB, Jan. 1994, 161 pages.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.
Aikawa et al., "Speech Recognition Using Time-Warping Neural Networks", Proceedings of the 1991, IEEE Workshop on Neural Networks for Signal Processing, 1991, 10 pages.
Alfred App, "Alfred", Available online at <http://www.alfredapp.com/>, retrieved on Feb. 8, 2012, 5 pages.
Allen, J., "Natural Language Understanding", 2nd Edition, The Benjamin/Cummings Publishing Company, Inc., 1995, 671 pages.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Tokyo, 13 pages.
Alshawi, H., "Translation and Monotonic Interpretation/Generation", SRI International, Cambridge Computer Science Research Centre, Cambridge, Available online at <http://www.cam.sri.com/tr/crc024/paper.ps.Z 1992>, Jul. 1992, 18 pages.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Archbold et al., "A Team User's Guide", SRI International, Dec. 21, 1981, 70 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech and Signal Processing (ICASSP'83), Apr. 1983, 4 pages.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May, 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input—A Data-Driven Approach to the Capture of both Local and Global Language Constraints", Available online at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.

(56) References Cited

OTHER PUBLICATIONS

Appelt et al., "SRI: Description of the JV-FASTUS System used for MUC-5", SRI International, Artificial Intelligence Center, 1993, 19 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Lyons et al., "Augmenting Conversations Using Dual-Purpose Speech", available at <http://research.nokia.com/files/2004-LYONS-UIST04-DPS.pdf>, 2004, 10 pages.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf>>, retrieved from internet on Jan.-Mar. 1999.
Schnelle, D., "Context Aware Voice User Interfaces for Workflow Support", Dissertation paper, Aug. 27, 2007, 254 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: a Speaker Mapping Approach to Data Augmentation", IEEE Transactions on Speech and Audio Processing, vol. 2, No. 3, Jul. 1994, 8 pages.
Belvin et al., "Development of the HRL Route Navigation Dialogue System", Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Black et al., "Automatically Clustering Similar Units for Unit Selection in Speech Synthesis", Proceedings of Eurospeech, vol. 2, 1997, 4 pages.
Blair et al., "An Evaluation of Retrieval Effectiveness for a Full-Text Document-Retrieval System", Communications of the ACM, vol. 28, No. 3, Mar. 1985, 11 pages.
Bobrow et al., "Knowledge Representation for Syntactic/Semantic Processing", From: AAA-80 Proceedings, Copyright 1980, AAAI, 1980, 8 pages.
Bouchou et al., "Using Transducers in Natural Language Database Query", Proceedings of 4th International Conference on Applications of Natural Language to Information Systems, Austria, Jun. 1999, 17 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., Ed, Directions and Challenges, 15th Annual Technical Symposium, Gaithersbury, Maryland, Jun. 17, 1976, 7 pages.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Bussey, et al., "Service Architecture, Prototype Description and Network Implications of a Personalized Information Grazing Service", INFOCOM'90, Ninth Annual Joint Conference of the IEEE Computer and Communication Societies, Available online at <http://slrohall.com/oublications/>, Jun. 1990, 8 pages.
Bussler et al., "Web Service Execution Environment (WSMX)", Retrieved from Internet on Sep. 17, 2012, Available online at <http://wwww3.org/Submission/WSMX>, Jun. 3, 2005, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech and Signal Processing, vol. Assp-28, No. 5, Oct. 1980, 13 pages.
Caminero-Gil et al., "Data-Driven Discourse Modeling for Semantic Interpretation", Proceedings of the IEEE International Conference on Acoustics, Speech and Signal Processing, May 1996, 6 pages.
Carter, D., "Lexical Acquisition in the Core Language Engine", Proceedings of the Fourth Conference of the European Chapter of the Association for Computational Linguistics, 1989, 8 pages.
Carter et al., "The Speech-Language Interface in the Spoken Language Translator", SRI International, Nov. 23, 1994, 9 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages. (3 pages of English Translation and 3 pages of Office Action).
Chen, Yi, "Multimedia Siri Finds and Plays Whatever You Ask for", PSFK Report, Feb. 9, 2012, 9 pages.
Cheyer, Adam, "A Perspective on AI & Agent Technologies for SCM", VerticalNet Presentation, 2001, 22 pages.
Cheyer, Adam, "About Adam Cheyer", Available online at <http://www.adam.cheyer.com/about.html>, retrieved on Sep. 17, 2012, 2 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Codd, E. F., "Databases: Improving Usability and Responsiveness—How About Recently", Copyright 1978, Academic Press, Inc., 1978, 28 pages.
Cohen et al., "An Open Agent Architecture", Available Online at <http://citeseerx.ist.psu.edu/viewdoc/summary?doi=10.1.1.30.480>, 1994, 8 pages.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 Pages.
Coles et al., "The Application of Theorem Proving to Information Retrieval", SRI International, Jan. 1971, 21 pages.
Conklin, Jeff, "Hypertext: An Introduction and Survey", Computer Magazine, Sep. 1987, 25 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.

(56) References Cited

OTHER PUBLICATIONS

Cox et al., "Speech and Language Processing for Next-Millennium Communications Services", Proceedings of the IEEE, vol. 88, No. 8, Aug. 2000, 24 pages.

Craig et al., "Deacon: Direct English Access and Control", AFIPS Conference Proceedings, vol. 19, San Francisco, Nov. 1966, 18 pages.

Cutkosky et al., "PACT: An Experiment in Integrating Concurrent Engineering Systems", Journal & Magazines, Computer, vol. 26, No. 1, Jan. 1993, 14 pages.

Dar et al., "DTL's DataSpot: Database Exploration Using Plain Language", Proceedings of the 24th VLDB Conference, New York, 1998, 5 pages.

Davis et al., "A Personal Handheld Multi-Modal Shopping Assistant", IEEE, 2006, 9 pages.

Decker et al., "Designing Behaviors for Information Agents", The Robotics Institute, Carnegie-Mellon University, Paper, Jul. 1996, 15 pages.

Decker et al., "Matchmaking and Brokering", The Robotics Institute, Carnegie-Mellon University, Paper, May 1996, 19 pages.

Deerwester et al., "Indexing by Latent Semantic Analysis", Journal of the American Society for Information Science, vol. 41, No. 6, Sep. 1990, 19 pages.

Deller, Jr. et al., "Discrete-Time Processing of Speech Signals", Prentice Hall, ISBN: 0-02-328301-7, 1987, 14.

Digital Equipment Corporation, "Open Vms Software Overview", Software Manual, Dec. 1995, 159 pages.

Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.

Jennings et al., "A Personal News Service Based on a User Model Neural Network", IEICE Transactions on Information and Systems, vol. E75-D, No. 2, Mar. 1992, 12 pages.

Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.

Johnson, Julia Ann., "A Data Management Strategy for Transportable Natural Language Interfaces", Doctoral Thesis Submitted to the Department of Computer Science, University of British Columbia, Canada, Jun. 1989, 285 pages.

Jones, J., "Speech Recognition for Cyclone", Apple Computer, Inc., E.R.S. Revision 2.9, Sep. 10, 1992, 93 pages.

Julia et al., "Http://www.speech.sri.com/demos/atis.html", Proceedings of AAAI, Spring Symposium, 1997, 5 pages.

Julia et al., "Un Editeur Interactif De Tableaux Dessines a Main Levee (An Interactive Editor for Hand-Sketched Tables)", Traitement du Signal, vol. 12, No. 6, 1995, pp. 619-626.

Kahn et al., "CoABS Grid Scalability Experiments", Autonomous Agents and Multi-Agent Systems, vol. 7, 2003, pp. 171-178.

Kamel et al., "A Graph Based Knowledge Retrieval System", IEEE International Conference on Systems, Man and Cybernetics, 1990, pp. 269-275.

Karp, P. D., "A Generic Knowledge-Base Access Protocol", Available online at <http://lecture.cs.buu.ac.th/-f50353/Document/gfp.pdf>, May 12, 1994, 66 pages.

Katz, Boris, "A Three-Step Procedure for Language Generation", Massachusetts Institute of Technology, A.I. Memo No. 599, Dec. 1980, pp. 1-40.

Katz, Boris, "Annotating the World Wide Web Using Natural Language", Proceedings of the 5th RIAO Conference on Computer Assisted Information Searching on the Internet, 1997, 7 pages.

Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.

Katz et al., "Exploiting Lexical Regularities in Designing Natural Language Systems", Proceedings of the 12th International Conference on Computational Linguistics, 1988, pp. 1-22.

Katz et al., "REXTOR: A System for Generating Relations from Natural Language", Proceedings of the ACL Workshop on Natural Language Processing and Information Retrieval (NLP&IR), Oct. 2000, 11 pages.

Katz, Boris, "Using English for Indexing and Retrieving", Proceedings of the 1st RIAO Conference on User-Oriented Content-Based Text and Image Handling, 1988, pp. 314-332.

Kitano, H., "PhiDM-Dialog, An Experimental Speech-to-Speech Dialog Translation System", Computer, vol. 24, No. 6, Jun. 1991, 13 pages.

Klabbers et al., "Reducing Audible Spectral Discontinuities", IEEE Transactions on Speech and Audio Processing, vol. 9, No. 1, Jan. 2001, 13 pages.

Klatt et al., "Linguistic Uses of Segmental Duration in English: Acoustic and Perpetual Evidence", Journal of the Acoustical Society of America, vol. 59, No. 5, May 1976, 16 pages.

Knownav, "Knowledge Navigator", YouTube Video available at <http://www.youtube.com/watch?v=QRH8eimU_20>, Apr. 29, 2008, 1 page.

Kominek et al., "Impact of Durational Outlier Removal from Unit Selection Catalogs", 5th ISCA Speech Synthesis Workshop, Jun. 14-16, 2004, 6 pages.

Konolige, Kurt, "A Framework for a Portable Natural-Language Interface to Large Data Bases", SRI International, Technical Note 197, Oct. 12, 1979, 54 pages.

Kubala et al., "Speaker Adaptation from a Speaker-Independent Training Corpus", International Conference on Acoustics, Speech and Signal Processing (ICASSP'90), Apr. 1990, 4 pages.

Kubala et al., "The Hub and Spoke Paradigm for CSR Evaluation", Proceedings of the Spoken Language Technology Workshop, Mar. 1994, 9 pages.

Laird et al., "SOAR: An Architecture for General Intelligence", Artificial Intelligence, vol. 33, 1987, pp. 1-64.

Langley et al., "A Design for the Icarus Architechture", SIGART Bulletin, vol. 2, No. 4, 1991, pp. 104-109.

Larks, "Intelligent Software Agents", Available online at <http://www.cs.cmu.eduk-softagents/larks.html> retrieved on Mar. 15, 2013, 2 pages.

Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.

Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.

Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.

Lee, K. F., "Large-Vocabulary Speaker-Independent Continuous Speech Recognition: The SPHINX System", Partial Fulfillment of the Requirements for the Degree of Doctor of Philosophy, Computer Science Department, Carnegie Mellon University, Apr. 1988, 195 pages.

Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.

Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.

Leong et al., "CASIS: A Context-Aware Speech Interface System", Proceedings of the 10th International Conference on Intelligent User Interfaces, Jan. 2005, pp. 231-238.

Lieberman et al., "Out of Context: Computer Systems that Adapt to, and Learn from, Context", IBM Systems Journal, vol. 39, No. 3 & 4, 2000, pp. 617-632.

Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.

(56) References Cited

OTHER PUBLICATIONS

Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.
Lowerre, B. T., "The-Harpy Speech Recognition System", Doctoral Dissertation, Department of Computer Science, Carnegie Mellon University, Apr. 1976, 20 pages.
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.
Markel et al., "Linear Prediction of Speech", Springer-Verlag, Berlin, Heidelberg, New York, 1976, 12 pages.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., Information Brokering in an Agent Architecture, Proceedings of the Second International Conference on the Practical Application of Intelligent Agents and Multi-Agent Technology, Apr. 1997, pp. 1-20.
Martin et al., "Transportability and Generality in a Natural-Language Interface System", Proceedings of the Eighth International Joint Conference on Artificial Intelligence, Technical Note 293, Aug. 1983, 21 pages.
Matiasek et al., "Tamic-P: A System for NL Access to Social Insurance Database", 4th International Conference on Applications of Natural Language to Information Systems, Jun. 1999, 7 pages.
McGuire et al., "Shade: Technology for Knowledge-Based Collaborative Engineering", Journal of Concurrent Engineering Applications and Research (CERA), 1993, 18 pages.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner, M., "Abductive Equivalential Translation and its Application to Natural Language Database Interfacing", Dissertation Paper, SRI International, Sep. 1993, 162 pages.

Rayner et al., "Adapting the Core Language Engine to French and Spanish", Cornell University Library, Available online at <http:l/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner, Manny, "Linguistic Domain Theories: Natural-Language Database Interfacing from First Principles", SRI International, Cambridge, 1993, 11 pages.
Rayner et al., "Spoken Language Translation with Mid-90's Technology: A Case Study", Eurospeech, ISCA, Available online at <http://citeseerxist.psu.edu/viewdoc/summary?doi=10.1.1.54.8608>, 1993, 4 pages.
Remde et al., "SuperBook: An Automatic Tool for Information Exploration-Hypertext?", In Proceedings of Hypertext, 87 Papers, Nov. 1987, 14 pages.
Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, Available online at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Roddy et al., "Communication and Collaboration in a Landscape of B2B eMarketplaces", VerticalNet Solutions, White Paper, Jun. 15, 2000, 23 pages.
Rosenfeld, R., "A Maximum Entropy Approach to Adaptive Statistical Language Modelling", Computer Speech and Language, vol. 10, No. 3, Jul. 1996, 25 pages.
Roszkiewicz, A., "Extending your Apple", Back Talk-Lip Service, A+ Magazine, The Independent Guide for Apple Computing, vol. 2, No. 2, Feb. 1984, 5 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
San-Segundo et al., "Confidence Measures for Dialogue Management in the CU Communicator System", Proceedings of Acoustics, Speech and Signal Processing (ICASSP'00), Jun. 2000, 4 pages.

(56) References Cited

OTHER PUBLICATIONS

Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schmandt et al., "Augmenting a Window System with Speech Input", IEEE Computer Society, Computer, vol. 23, No. 8, Aug. 1990, 8 pages.
Schütze, H., "Dimensions of Meaning", Proceedings of Supercomputing'92 Conference, Nov. 1992, 10 pages.
Seneff et al., "A New Restaurant Guide Conversational System: Issues in Rapid Prototyping for Specialized Domains", Proceedings of Fourth International Conference on Spoken Language, vol. 2, 1996, 4 pages.
Sharoff et al., "Register-Domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "InfoHarness: Use of Automatically Generated Metadata for Search and Retrieval of Heterogeneous Information", Proceedings of CAiSE'95, Finland, 1995, 14 pages.
Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture TM 1.0 Distributiom", Open Agent Architecture (OAA), 1999, 2 pages.
SRI2009, "SRI Speech: Products: Software Development Kits: EduSpeak", Available online at <http://web.archive.org/web/20090828084033/http://www.speechatsri.com/products/eduspeak/shtml>, 2009, 2 pages.
Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection—Graph Resolution Theorem-Proving Program", Proceedings of AAAI'82, 1982, 5 pages.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", Prentice-Hall, Inc., 1981, 34 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakTolt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1994, 9 pages.
Van Santen, J. P.H., "Contextual Effects on Vowel Duration", Journal Speech Communication, vol. 11, No. 6, Dec. 1992, pp. 513-546.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.
Vingron, Martin, "Near-Optimal Sequence Alignment", Current Opinion in Structural Biology, vol. 6, No. 3, 1996, pp. 346-352.
Vlingo, "Vlingo Launches Voice Enablement Application on Apple App Store", Press Release, Dec. 3, 2008, 2 pages.
Vlingo Lncar, "Distracted Driving Solution with Vlingo InCar", YouTube Video, Available online at <http://www.youtube.com/watch?v=Vqs8XfXxgz4>, Oct. 2010, 2 pages.
Voiceassist, "Send Text, Listen to and Send E-Mail by Voice", YouTube Video, Available online at <http://www.youtube.com/watch?v=0tEU61nHHA4>, Jul. 30, 2009, 1 page.
VoiceontheGo, "Voice on the Go (BlackBerry)", YouTube Video, available online at <http://www.youtube.com/watch?v=pJqpWgQS98w>, Jul. 27, 2009, 1 page.
Wahlster et al., "Smartkom: Multimodal Communication with a Life-Like Character", Eurospeech—Scandinavia, 7th European Conference on Speech Communication and Technology, 2001, 5 pages.
Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", ACM, vol. 21, No. 7, 1978, 14 pages.
Ward et al., "A Class Based Language Model for Speech Recognition", IEEE, 1996, 3 pages.

(56) References Cited

OTHER PUBLICATIONS

Ward et al., "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Warren et al., "An Efficient Easily Adaptable System for Interpreting Natural Language Queries", American Journal of Computational Linguistics, vol. 8, No. 3-4 , 1982, 11 pages.
Weizenbaum, J., "ELIZA—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wolff, M., "Post Structuralism and the Artful Database: Some Theoretical Considerations", Information Technology and Libraries, vol. 13, No. 1, Mar. 1994, 10 pages.
Wu, M., "Digital Speech Processing and Coding", Multimedia Signal Processing, Lecture-2 Course Presentation, University of Maryland, College Park, 2003, 8 pages.
Wu et al., "KDA: A Knowledge-Based Database Assistant", Proceeding of the Fifth International Conference on Engineering (IEEE Cat.No. 89CH2695-5), 1989, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995, 13 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhao et al., "Intelligent Agents for Flexible Workflow Systems", Proceedings of the Americas Conference on Information Systems (AMCIS), Oct. 1998, 4 pages.
Zovato et al., "Towards Emotional Speech Synthesis: A Rule based Approach", Proceedings of 5th Isca Speech Synthesis Workshop—Pittsburgh, 2004, pp. 219-220.
Zue, Victor, "Conversational Interfaces: Advances and Challenges", Spoken Language System Group, Sep. 1997, 10 pages.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Meng et al., "Wheels: A Conversational System in the Automobile Classified Domain", Proceedings of Fourth International Conference on Spoken Language, ICSLP 96, vol. 1, Oct. 1996, 4 pages.
Michos et al., "Towards an Adaptive Natural Language Interface to Command Languages", Natural Language Engineering, vol. 2, No. 3, 1996, pp. 191-209.

Milstead et al., "Metadata: Cataloging by Any Other Name", Available online at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", Available online at <http://www.ihmc.us/users/nblaylock!Pubs/Files/talk d2.2.pdf>, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, Artificial Intelligence Center, 1995, 4 pages.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Muhlhauser, Max, "Context Aware Voice User Interfaces for Workflow Support", 2007, 254 pages.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics, Speech and Signal Processing (ICASSP), Mar. 2010, 4 pages.
Naone, Erica, "TR10: Intelligent Software Assistant", Technology Review, Mar.-Apr. 2009, 2 pages.

(56) References Cited

OTHER PUBLICATIONS

Neches et al., "Enabling Technology for Knowledge Sharing", Fall, 1991, pp. 37-56.
Niesler et al., "A Variable-Length Category-Based N-Gram Language Model", IEEE International Conference on Acoustics, Speech and Signal Processing (ICASSP'96), vol. 1, May 1996, 6 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE—A Scalable Agent-Based Information Retrieval Engine", Proceedings of the First International Conference on Autonomous Agents, 1997, 12 pages.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Search Report received for PCT Patent Application No. PCT/US1993/012666, dated Nov. 9, 1994, 8 pages.
International Preliminary Report on Patentability received for PCT Patent Application No. PCT/US1994/011011, dated Feb. 28, 1996, 4 pages.
International Search Report received for PCT Patent Application No. PCT/US1994/011011, dated Feb. 8, 1995, 7 pages.
Written Opinion received for PCT Patent Application No. PCT/US1994/011011, dated Aug. 21, 1995, 4 pages.
International Preliminary Report on Patentability received for PCT Patent Application No. PCT/US1995/008369, dated Oct. 9, 1996, 4 pages.
International Search Report received for PCT Patent Application No. PCT/US1995/008369, dated Nov. 8, 1995, 6 pages.
International Search Report and Written Opinion received for PCT Patent Application No. PCT/US2011/020861, dated Nov. 29, 2011, 12 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Picone, J., "Continuous Speech Recognition using Hidden Markov Models", IEEE ASSP Magazine, vol. 7, No. 3, Jul. 1990, 16 pages.
Pulman et al., "Clare: A Combined Language and Reasoning Engine", Proceedings of JFIT Conference, Available online at <http://www.cam.sri.com/tr/crc042/paper.ps.Z>, 1993, 8 pages.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donovan, R. E., "A New Distance Measure for Costing Spectral Discontinuities in Concatenative Speech Synthesisers", Available online at <http://citeseerx.ist.osu.edu/viewdoc/summarv?doi=10.1.1.21.6398>, 2001, 4 pages.

Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Elio et al., "On Abstract Task Models and Conversation Policies", Proc. Workshop on Specifying and Implementing Conversation Policies, Autonomous Agents'99 Conference, 1999, pp. 1-10.
Epstein et al., "Natural Language Access to a Melanoma Data Base", SRI International, Sep. 1978, 7 pages.
Ericsson et al., "Software Illustrating a Unified Approach to Multimodality and Multilinguality in the In-Home Domain", Talk and Look: Tools for Ambient Linguistic Knowledge, Dec. 2006, 127 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Feigenbaum et al., "Computer-Assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-Based Knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistance", CiteSeerx, Proceedings of IUI'05, Jan. 2005, pp. 90-97.
Glass, Alyssa, "Explaining Preference Learning", CiteSeerx, 2006, pp. 1-5.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Goddeau et al., "A Form-Based Dialogue Manager for Spoken Language Applications", Available online at <http://phasedance.com/pdf!icslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.

(56) References Cited

OTHER PUBLICATIONS

Gregg et al., "DSS Access on the WWW: An Intelligent Agent Prototype", Proceedings of the Americas Conference on Information Systems, Association for Information Systems, 1998, 3 pages.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz, B., "Team: A Transportable Natural-Language Interface System", Proceedings of the First Conference on Applied Natural Language Processing, 1983, 7 pages.
Grosz et al., "TEAM: An Experiment in the Design of Transportable Natural-Language Interfaces", Artificial Intelligence, vol. 32, 1987, 71 pages.
Gruber, Tom, "(Avoiding) the Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Thomas R., "A Translation Approach to Portable Ontology Specifications", Knowledge Acquisition, vol. 5, No. 2, Jun. 1993, pp. 199-220.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber, Thomas R., "Automated Knowledge Acquisition for Strategic Knowledge", Machine Learning, vol. 4, 1989, pp. 293-336.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", Available online at <http://wwww3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant—Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber et al., "Toward a Knowledge Medium for Collaborative Product Development", Proceedings of the Second International Conference on Artificial Intelligence in Design, Jun. 1992, pp. 1-19.
Gruber, Thomas R., "Toward Principles for the Design of Ontologies used for Knowledge Sharing?", International Journal of Human-Computer Studies, vol. 43, No. 5-6, Nov. 1995, pp. 907-928.
Gruber, Tom, "Where the Social Web Meets the Semantic Web", Presentation at the 5th International Semantic Web Conference, Nov. 2006, 38 pages.
Guida et al., "NLI: A Robust Interface for Natural Language Person-Machine Communication", International Journal of Man-Machine Studies, vol. 17, 1982, 17 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, Available online at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni, D., "Active: A Unified Platform for Building Intelligent Assistant Applications", Oct. 25, 2007, 262 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Helm et al., "Building Visual Language Parsers", Proceedings of CHI'91, Proceedings of the SIGCHI Conference on Human Factors in Computing Systems, 1991, 8 pages.
Hendrix et al., "Developing a Natural Language Interface to Complex Data", ACM Transactions on Database Systems, vol. 3, No. 2, Jun. 1978, pp. 105-147.

(56) References Cited

OTHER PUBLICATIONS

Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Hendrix et al., "Transportable Natural-Language Interfaces to Databases", SRI International, Technical Note 228, Apr. 30, 1981, 18 pages.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary—Independent Speech Recognition System", IEEE International Conference on Acoustics, Speech and Signal Processing (ICASSP-91), Apr. 1991, 4 pages.
Huang et al., "The SPHINX-II Speech Recognition System: An Overview", Computer, Speech and Language, vol. 7, No. 2, 1993, 14 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
Intraspect Software, "The Intraspect Knowledge Management Solution: Technical Overview", Available online at <http://tomgruber.org/writing/intraspect-whitepaper-1998.pdf>, 1998, 18 pages.
Iowegian International, "FIR Filter Properties, DSPGuru, Digital Signal Processing Central", Available online at <http://www.dspguru.com/dsp/faq/fir/properties> retrieved on Jul. 28, 2010, 6 pages.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Goliath, "2004 Chrysler Pacifica: U-Connect Hands-Free Communication System. (The Best and Brightest of 2004) (Brief Article)", Automotive Industries, Sep. 2003, 1 pages.
Massy, Kevin, "2007 Lexus GS 450H, 4Dr Sedan (3.5L, 6cyl Gas/Electric Hybrid CVT)", ZDNet Reviews, Reviewed on Aug. 3, 2006, 10 pages.
"All Music", Available online at <http://www.allmusic.com/cg/amg.dll?p=amg&sql=32:amg/info_pages/a_about.html>, retrieved on Mar. 19, 2007, 2 pages.
"BluePhoneElite: About", Available online at <http://www.reelintelligence.com/BluePhoneElite>, retrieved on Sep. 25, 2006, 2 pages.
"BluePhoneElite: Features", Available online at <http://www.reelintelligence.com/BluePhoneElite/features.shtml>, retrieved on Sep. 25, 2006, 2 pages.
"Digital Audio in the New Era", Electronic Design and Application, No. 6, Jun. 30, 2003, 3 pages.
"Interactive Voice", Available online at <http://www.helloivee.com/company/>, retrieved on Feb. 10, 2014, 2 pages.
"Meet Ivee, Your Wi-Fi Voice Activated Assistant", Available online at <http://www.helloivee.com/>, retrieved from on Feb. 10, 2014, 8 pages.
"Mobile Speech Solutions, Mobile Accessibility", SVOX AG Product Information Sheet, Available online at <http://www.svox.com/site/bra840604/con782768/mob965831936.aSQ?osLang=1>, 1 page.
Wireless Ground, "N200 Hands-Free Bluetooth Car Kit", Available on line at <www.wirelessground.com>, retrieved on Mar. 19, 2007, 3 pages.
"PhatNoise", Voice Index on Tap, Kenwood Music Keg, Available online at <http://www.phatnoise.com/kenwood/kenwoodssamail.html>, retrieved on Jul. 13, 2006, 1 pages.
"What is Fuzzy Logic?", Available online at <http://www.cs.cmu.edu/Groups/AI/html/faqs/ai/fuzzy/part1/faq-doc-2.html>, retrieved on Mar. 19, 2007, 5 pages.
"Windows XP: A Big Surprise!—Experiencing Amazement from Windows XP", New Computer, No. 2, Feb. 28, 2002, 8 pages.
Aikawa et al., "Generation for Multilingual MT", Available online at <http://mtarchive.info/MTS-2001-Aikawa.pdf>, retrieved on Sep. 18, 2001, 6 pages.
Anhui USTC IFL Ytek Co. Ltd., "Flytek Research Center Information Datasheet", Available online at <http://www.iflttek.com/english/Research_htm>, retrieved on Oct. 15, 2004, 3 pages.
Anonymous, "Speaker Recognition", Wikipedia, The Free Encyclopedia, Nov. 2, 2010, 4 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Borden IV, G.R., "An Aural User Interface for Ubiquitous Computing", Proceedings of the 6th International Symposium on Wearable Computers, IEEE, 2002, 2 pages.
Brain, Marshall, "How MP3 Files Work", Available online at <http://computerhowstuffworks.com/mp31.htm>, retrieved on Mar. 19, 2007, 4 pages.
Chang et al., "Discriminative Training of Dynamic Programming Based Speech Recognizers", IEEE Transactions on Speech and Audio Processing, vol. 1, No. 2, Apr. 1993, pp. 135-143.
Cheyer et al., "Demonstration Video of Multimodal Maps Using an Agent Architecture", Published by SRI International no later than 1996, as Depicted in Exemplary Screenshots from Video Entitled "Demonstration Video of Multimodal Maps Using an Agent Architecture", 1996, 6 pages.
Cheyer et al., "Demonstration Video of Multimodal Maps Using an Open-Agent Architecture", Published by SRI International no later than 1996, as Depicted in Exemplary Screenshots from Video

(56) References Cited

OTHER PUBLICATIONS

Entitled "Demonstration Video of Multimodal Maps Using an Open-Agent Architecture", 6 pages.
Cheyer, A., "Demonstration Video of Vanguard Mobile Portal", Published by SRI International no later than 2004, as Depicted in Exemplary Screenshots from Video Entitled "Demonstration Video of Vanguard Mobile Portal", 2004, 10 pages.
Choi et al., "Acoustic and Visual Signal Based Context Awareness System for Mobile Application", IEEE Transactions on Consumer Electronics, vol. 57, No. 2, May 2011, pp. 738-746.
Dusan et al., "Multimodal Interaction on PDA's Integrating Speech and Pen Inputs", Eurospeech Geneva, 2003, 4 pages.
Kickstarter, "Ivee Sleek: Wi-Fi Voice-Activated Assistant", Available online at <https://www.kickstarter.com/discover/categories/hardware?ref=category>, retrieved on Feb. 10, 2014, 13 pages.
Lamel et al., "Generation and Synthesis of Broadcast Messages", Proceedings of ESCA-NATO Workshop: Applications of Speech Technology, Sep. 10, 1993, 4 pages.
Macsimum News, "Apple Files Patent for an Audio Interface for the iPod", Available online at <http://www.macsimumnews.com/index.php/archive/apple_files_patent_for_an_audio_interface_for_the_ipod>, retrieved on May 4, 2006, 8 pages.
Navigli, Roberto, "Word Sense Disambiguation: A Survey", ACM Computing Surveys, vol. 41, No. 2, Article 10, Feb. 2009, 70 pages.
International Search Report and Written Opinion received for PCT Patent Application No. PCT/US2004/016519, dated Nov. 3, 2005, 16 pages.
Partial International Search Report and Invitation to Pay Additional Fees received for PCT Patent Application No. PCT/US2004/016519, dated Aug. 4, 2005, 6 pages.
International Search Report received for PCT Patent Application No. PCT/US2011/037014, dated Oct. 4, 2011, 6 pages.
Invitation to Pay Additional Search Fees received for PCT Application No. PCT/US2011/037014, dated Aug. 2, 2011, 6 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
International Search Report and Written Opinion received for PCT Patent Application No. PCT/US2012/043098, dated Nov. 14, 2012, 9 pages.
International Search Report and Written Opinion received for PCT Patent Application No. PCT/US2012/056382, dated Dec. 20, 2012, 11 pages.
Gong et al., "Guidelines for Handheld Mobile Device Interface Design", Proceedings of DSI 2004 Annual Meeting, 2004, pp. 3751-3756.
International Search Report and Written Opinion received for PCT Patent Application No. PCT/US2013/040971, dated Nov. 12, 2013, 11 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Ricker, T., "Apple Patents Auciio User Interface", Engadget, Available online at <http://www.engadget.com/2006/05/04/apple-patents-audio-user-interface>, May 4, 2006, 6 pages.
Santaholma, M., "Grammar Sharing Techniques for Rule-Based Multilingual NLP Systems", Proceedings of the 16th Nordic Conference of Computational Linguistics, NODALIDA 2007, May 25, 2007, 8 pages.
Taylor et al., "Speech Synthesis by Phonological Structure Matching", International Speech Communication Association, vol. 2, Section 3, 1999, 4 pages.
Xu, "Speech-Based Interactive Games for Language Learning: Reading, Translation and Question-Answering", Computational Linguistics and Chinese Language Processing, vol. 14, No. 2, Jun. 2009, pp. 133-160.
Yunker, John, "Beyond Borders: Web Globalization Strategies", New Riders, Aug. 22, 2002, 11 pages.
Combined Search Report and Examination Report under Sections 17 and 18(3) received for GB Patent Application No. 1009318.5, dated Oct. 8, 2010, 5 pages.
Combined Search Report and Examination Report under Sections 17 and 18(3) received for GB Patent Application No. 1217449.6, dated Jan. 17, 2013, 6 pages.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.

\* cited by examiner

SYSTEM AND METHOD FOR PROCESSING VOICEMAIL

CROSS-REFERENCE TO RELATED APPLICATIONS

This application claims the benefit of U.S. Provisional Application No. 61/783,984, filed on Mar. 14, 2013, entitled SYSTEM AND METHOD FOR PROCESSING VOICEMAIL, which is hereby incorporated by reference in its entity for all purposes.

This application is related to U.S. patent application Ser. No. 12/794,650, and U.S. Provisional Patent Application No. 61/184,717, entitled SMART DEDUCTION OF VOICE COMMANDS, filed Jun. 5, 2009, which are both hereby incorporated by reference in their entireties and for all purposes.

TECHNICAL FIELD

The subject matter described herein relates to systems and methods for automatically recognizing and acting on the content of voicemail messages.

BACKGROUND

Most modern cellular telephone carriers offer a voicemail service. Conventional voicemail, however, is cumbersome to use, especially when a user needs to extract and/or act on information contained in a voicemail message. For example, if a user receives a voicemail message, and the user needs to extract and act on information contained in a voicemail message, the user needs to perform numerous steps to deal with the message. For example, if a caller leaves a voicemail message asking the user to email the caller a copy of a presentation that the user gave the day before, the user must first listen to the voicemail message; open an email application; locate the email address of the caller; attach the presentation to the email; and then send the email to the caller. This process is inefficient and time consuming. Accordingly, it would be desirable to have an automated system perform as many of these tasks as possible.

SUMMARY

According to some implementations there is provided a method of operating a digital assistant. The method occurs at a device having one or more processors and memory, such as at a mobile telephone. A recorded voice message is provided from a caller to a user. For example a caller leaves a voicemail message for the user of the mobile device. In some embodiments, the recorder voicemail is first converted from speech to text.

A proposed action to be performed by the user is then extracted from the voice message. For example, the voicemail may state "this is John, call me at 650.987.0987 at 9 am tomorrow." Here, the action is to call John.

At least one action parameter for undertaking the action is determined. Using the same example, the at least one action parameter includes (i) the telephone number of 650.987.0987, and 9 am the following morning. The at least one action parameter may be extracted from the voicemail message or it may be determined by other means. For example, the caller's telephone number may be obtained from caller identification, or by looking-up the caller's telephone number in the user's contact book.

Finally, the user is presented with a prompt to facilitate undertaking the action using the at least one the parameter. For example, the user may be given the option to set a reminder to call John the following morning at 9 am.

Some implementations provide a non-transitory computer-readable storage medium storing one or more programs for execution by the one or more processors. The one or more programs comprise instructions for performing the methods described herein.

Finally, some implementations provide a mobile or cellular telephone that includes a processor and memory coupled to the processor. The memory includes instructions for performing the methods described herein.

In some implementations, many or all of these steps occur automatically without user intervention.

The automatic processing of incoming voicemail messages realizes one or more of the following potential advantages. First, it reduces or eliminates the user having to remember, write down or type in contacts details left by callers in voicemail messages. Second, it provides a useful and convenient mechanism for users to process and respond to incoming voicemail messages. Accordingly, automatic processing of incoming voicemail messages saves the user time and effort, and greatly improves the efficiency of responding to or acting on information contained in received voicemail messages.

Details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
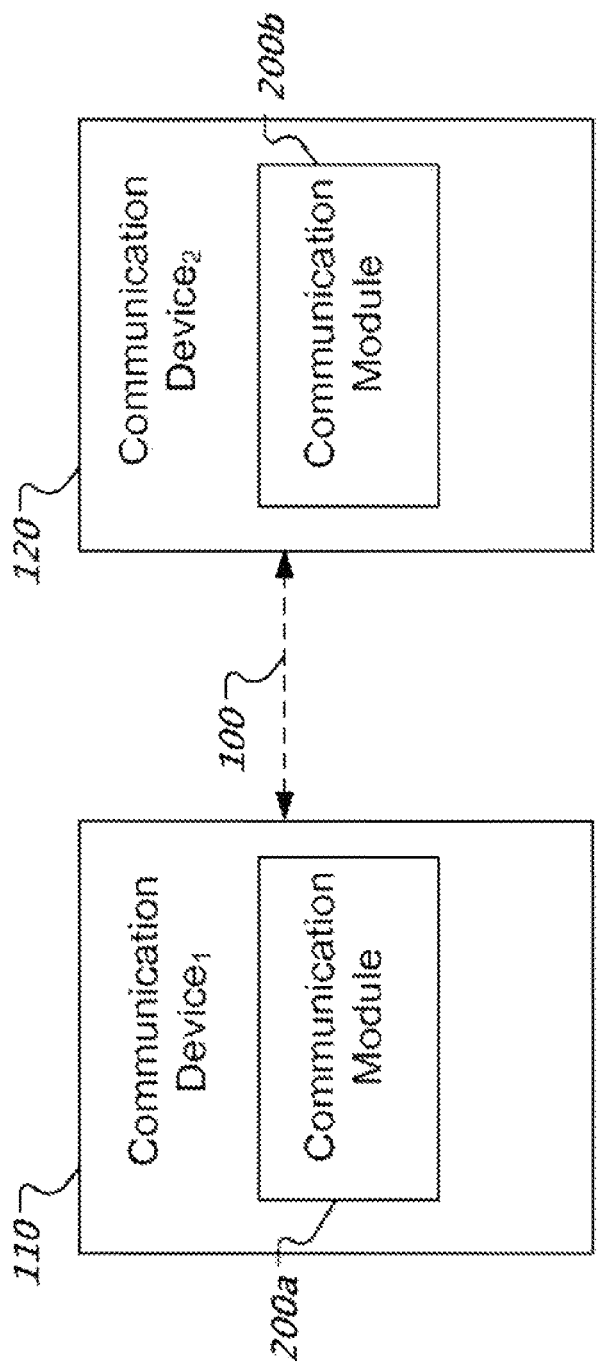
FIG. 1 is a block diagram illustrating example communication devices.

FIG. 1 is a block diagram illustrating example communication devices 110 and 120. The communication devices 110 and 120 can each be configured to receive and transmit data using a communication channel 100, e.g., an electronic channel such as a channel in a wired or wireless network. As an example, the communication devices 110 and 120 can receive and transmit digital audio signals over a multi-media broadband network. The communication devices 110 and 120 can connect over the communication channel 100 automatically, or in response to user input requesting a connection. For example, a first user operating the communication device 110 can input a second user's phone number to establish a connection with the communication device 120 operated by a second user. The communication devices 110 and 120 can receive and transmit multimedia data, including video content, audio content, image content, textual content, or any combination thereof over the communication channel 100.

In some implementations, a communication device is a physical device implemented as hardware and configured to operate a software program. In some alternative implementations, a communication device is a virtual device that is implemented as a software application or module that is configured to establish a connection with another communication device. As examples, the communication devices 110 and 120 can be or be implemented as software in a mobile phone, personal digital assistant, portable computer, desktop computer, or other electronic communication device. Examples of communication channels 100 include Internet Protocol-based networks, cellular telephone networks, satellite networks, and other communication networks. Note that one or more other communication devices, in addition to the communication devices 110 and 120, can be connected over the communication channel 100.

The communication devices 110 and 120 can communicate in real-time or near real-time over the communication channel 100. For example, a real-time communication session, such as a phone conversation, can be conducted using two or more communication devices. In addition, a communication session can be established using voice-over Internet Protocol full duplex communications. The communication devices 110 and 120 can be implemented to permit full duplex conversations that include any electronically assisted communication mechanism or channel, e.g., over a mobile broadband network. The bidirectional nature of the communication devices 110 and 120 can enable two or more users to simultaneously exchange voice information during a communication session, e.g., a phone call. Voice information corresponds to the voice communication, e.g., conversation, between the parties to the communication session.

A communication device can include a communication module. In FIG. 1, communication device 110 includes a communication module 200a, and communication device 120 includes a communication module 200b. A communication module (e.g., communication module 200a, communication module 200b) can be configured to process audio data, e.g., digital audio data, received from a communication device. For example, the communication module can process audio data communicated: by a user operating the communication device 110; in a voicemail message; and from an interactive voice response device. The communication module can be located internal or external to a communication device. In some implementations, the communication module can be implemented in hardware and configured to operate a software program. In some alternative implementations, the communication module is a software application or module that is configured to process digital audio data. The communication module can also be configured to process commands received from a user through a microphone operatively coupled to the communication device in which the communication module is located.

Figure 2:
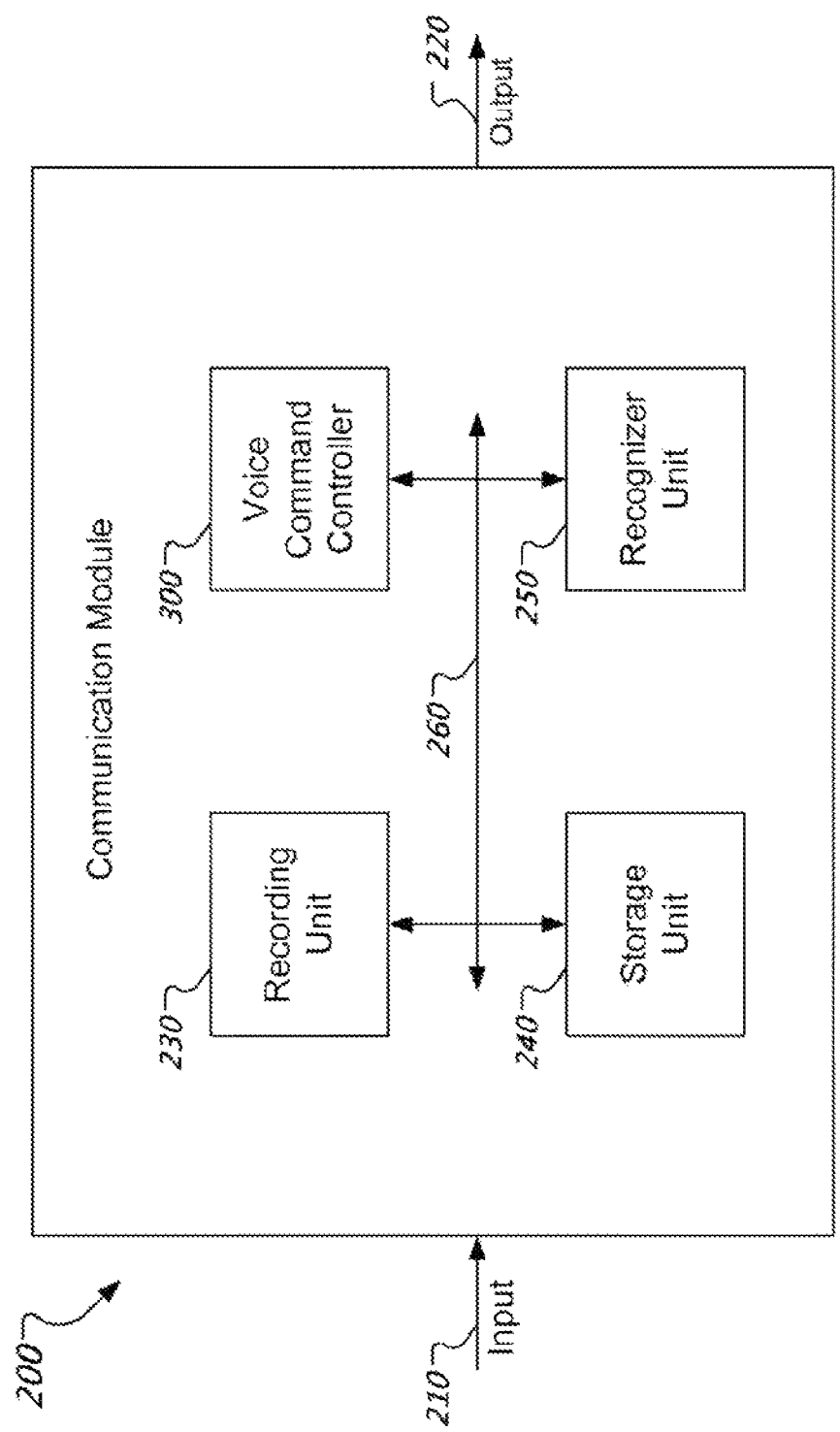
FIG. 2 is a block diagram illustrating an example communication module.

FIG. 2 is a block diagram illustrating an example communication module 200. The communication module 200 includes a recording unit 230, a storage unit 240, a recognizer unit 250, and a voice command controller 300. These functions performed by these components can be combined or subdivided into components in ways other than those shown in FIG. 2. In addition, these components can be implemented in hardware and configured to operate a software program, or can be implemented as a software application or module.

Each of the components 230, 240, 250, and 300 can be interconnected, for example, using a data communication link 260. The communication module 200 can receive input 210 and produce output 220. The received input 210 can be audio data, e.g., in the form of digital or analog audio signals. For example, the communication module 200 can receive voice information input 210 encoded in a digital audio signal. The output 220 can include audio data, visual data, textual data, or any combination thereof. The output 220 can be displayed graphically in a display screen, or a user interface provided by a software application running on the communication device. For example, the communication module 200 can generate textual data output corresponding to the received digital audio signals and can display the textual data output in a display, e.g., a touch screen display of a smart phone. In some implementations, one or more of the communication module components 230, 240, 250, and 300 are located external to the communication device in which the communication module is located. The recording unit 230 records audio data. The audio data can include both received and transmitted voice information.

The recording unit 230 can be implemented to record a communication session between two or more communication devices. For example, the recording unit 230 can record a portion, or the entirety, of a phone conversation between two users communicating with mobile phones.

The recording unit 230 can be configured, e.g., by setting user preferences, to record voice information originating from one or more participants, e.g., callers using different communication devices, of a communication session. In some implementations, user preferences are used to select one or more particular participants for which voice information is recorded by the recording unit 230.

As an example, the recording unit 230 can be configured to record only one side of the phone conversation. The recording unit 230 can be configured to capture voice information spoken only by a first caller on a far end of a phone call and not by a second caller on a near end. The first caller on the far end is a caller using a first communication device that is exchanging voice information during a communication session with a second caller using a second communication device. The second caller on the near end is a caller using the second communication device in which the recording unit 230 is located. Alternatively, the recording unit 230 can capture voice information spoken only by the second caller on the near end.

In some implementations, the recording unit 230 automatically records the communication session. In some implementations, the recording unit 230 records the communication session in response to user input. For example, the recording unit 230 can continuously record one or more sides of a conversation in response to a user pressing a hardware button, a virtual button, or a soft record button, or issuing a voice command.

In these and other implementations, the communication module 200 can provide a notification to each participant of which voice information is being recorded. The notification can be a visual notification displayed in a display of the communication module of each participant, or an audio notification played by the communication module of each participant. In FIG. 2, the communication module 200, e.g., the recording unit 230, can produce an output 220, such as an audible, visual or textual indicator notifying the caller on the far end, the near end, or both, that the conversation is being recorded.

In some implementations, the recording unit 230 determines an identifier that indicates a date and time, e.g., a time stamp, associated with the recorded audio data. In addition, the recording unit 230 can associate the recorded audio data with one or more other identifiers. Examples of identifiers include an identifier for a particular communication session, a particular communication device, or a particular user of a communication device, from which the recorded audio data was derived. The identifiers can be used to identify particular recorded audio data for processing.

The storage unit 240 can be implemented to store data, e.g., the recorded audio data. The storage unit 240 can receive audio data captured by the recording unit 230. For example, the storage unit 240 can store audio data and information associated with the audio data, e.g., the identifiers described above. The storage unit 240 can be implemented as a local storage device or local memory cache. In some implementations, the storage unit 240 is located external to both the communication module 200 and the communication device 120. For example, the storage unit 240 can reside in a server, e.g., a network device, located remotely from the communication device 120. Audio data stored at the storage unit 240 can be played back. Additionally, audio data stored at the storage unit 240 can be transcoded into textual data and can be provided as output 220.

The recognizer unit 250 can be implemented to automatically identify terms, e.g., identify without further user intervention one or more words, in the audio data received from a remote source, such as the communication device 110. In some implementations, the recognizer unit 250 uses conventional techniques and one or more language models to identify key words, e.g., part of speech, subject-verb-object word order (e.g., identifying declarative sentences) in the audio data. The recognizer unit 250 provides the key words as input to an application or service external to the communication module. As an example, the following conversation may occur:

User 1: "We should have dinner tonight at eight."
User 2: "I want sushi."[

The recognizer unit 250 can identify the key words "dinner", "eight", and "sushi". Furthermore, the recognizer unit 250 can work with a location based service to determine a geographical location of one or more of the communication devices being used by the users in the communication session. The recognizer unit 250 can determine that, based on the detected key words, that a restaurant reservation service (e.g., a web application that makes restaurant reservations) may be useful for the user.

In some implementations, the recognizer unit 250 sends the input to a suggestion service external to the communication device that makes this type of determination. In some implementations, pattern matching can be used to identify the terms. An example pattern for a term representing a city, state, and zip code is "City, State NNNNN", where N is a digit. An example pattern for a term representing an address is "X Y Drive", where X is a number and Y is one or more words associated with the name of the drive. An example pattern for a term representing a phone number is "NNN NNN NNNN", where N is a digit. Other patterns are possible.

In some implementations, the communication module 200 provides a notification to the user that the particular key words were detected and provide suggestions on how to act on the key words. For example, the communication module can provide visual feedback in the screen of the communication device that asks, "Would you like to make dinner reservations at 8:00 pm at a sushi restaurant?". In some implementations, the communication module 200 automatically provides, e.g., without further user intervention, the key words to an application or service external to the communication module. In the example, the communication module may work with a restaurant reservation service to generate a request for the reservation. In particular, the communication may initiate, at the restaurant reservation service, a request to search for sushi restaurants with reservations available at 8:00 pm in a predetermined proximity to the geographical location (e.g., within 10 miles).

Other implementations are possible. For example, the recognizer unit 250 can send the input to applications or services local or external to the communication device, e.g., email applications, web browsers, and work with the local applications or services to provide a suggested operation or automatically initiate a subsequent action, e.g., generate a draft email, request a particular web page.

In some implementations, the recognizer unit 250 can identify the terms as being commands, e.g., voice commands, or target information, e.g., information upon which a command operates or performs an action. Upon detecting a command and target information, the recognizer unit 250 can provide the command and target information as output 220 (e.g., audible, visual, textual output) indicating to the user of the communication device that the command and target information were detected, and request instructions from the user whether to store the command and target information in an information log.

The commands and target information can be detected by the recognizer unit 250 using various techniques. In some implementations, the recognizer unit 250 identifies commands by comparing terms in the audio data to a collection of terms specified as being commands, e.g., in a dictionary of commands. In some implementations, the recognizer unit 250 uses conventional techniques and one or more language models to identify commands and target information based on linguistics, e.g., part of speech, subject-verb-object word order (e.g., identifying declarative sentences). In these and other implementations, pattern matching can also be used to identify commands and target information. For example, a predetermined number of tokens, e.g., characters or words that follow a detected command can be identified as being target information.

As an example, the recognizer unit 250 can be configured to identify, in the audio data received from the remote source, the term "phone number" as being a command and the next ten numerals following the words "phone number" as being target information. Upon identifying the term "phone number," the recognizer unit 250 can be implemented to produce any of audible, visual, and textual output 220, indicating that the ten numerals associated with the words "phone number" have been recognized. The audio data from the remote source can be monitored by the recognizer unit 250 during any portion of the communication session. For example, the recognizer unit 250 can be implemented to continuously monitor spoken voice information transmitted from one or more communication devices during a phone conversation.

In some implementations, the recognizer unit 250 can detect key words in the audio data and send portions of the audio data associated with the detected key words to a recognizer service external to the communication device, e.g., a recognizer service located on a server device. The key words can be specified, for example, in a dictionary of key words. The portion of the audio data can be defined, for example, based on an amount of time before the key word occurs in the corresponding audio and an amount of time after the key word occurs, e.g., a portion of audio data that corresponds to the audio from seconds before the key word occurs to seconds after the key word occurs. The recognizer service can determine commands and target information and provide the commands and target information to the recognizer unit 250.

In some implementations, the recognizer unit 250 can generate an information log based on the identified terms, e.g., identified commands and target information, key words. In some implementations, the information log is a list or queue of information items (e.g., commands and target information) recognized during a communication session. When an information item is detected, the item of information can be added to the information log.

Additional information also can be associated with the item of information, such as a time stamp and/or an indication of the item's source, e.g., an identifier of a user or a communication device. The information log can be displayed, e.g., in a user interface of a communication device.

In some implementations, the communication module 200 provides a notification to a user of the communication device, e.g., a tone or haptic feedback, when a new information item is added to the information log. Once added to the information log, an item of information can be acted on. For example, a phone number recognized during a communication session and added to the information log can be dialed during the communication session, such as to initiate a three-way call. Also, an e-mail address can be accessed to generate a message or message template during the communication session.

The information log also can be accessed after the corresponding communication session ends. For example, a recognized telephone number can be used to initiate a new communication session or an item of contact information can be used to generate a new contact or update an existing contact. One or more items of information included in the information log also can be altered, including through editing and deleting. For example, the spelling of a recognized name can be corrected.

The information log can be stored to permit subsequent retrieval and processing. For example, a link to the information log corresponding to a communication session can be included in a call history list or a file structure, such as a folder or directory. In some implementations, an audio recording of the communication session can be accessed in conjunction with the information log, such as for verification of one or more recognized information items, In addition, a time stamp associated with an information item can be used to access the corresponding portion of the audio recording, permitting the information item to be compared with the corresponding recorded audio.

In some implementations, the recognizer unit 250 automatically stores the identified terms at the storage unit 240. In some implementations, the recognizer unit 250 stores the recognized words and phrases when a user responds to the audible, visual or textual output 220. In some implementations, the user responds to the output 220 with a response, such as by issuing a voice command or by pressing a hardware button, a virtual button, or a soft button to store the recognized words. Alternatively, the user can respond with a gesture, such as by holding the communication device 120 and making a pointing gesture, or with motion, such as by shaking the communication device 120.

The recognizer unit 250 can be implemented to receive audio data as the audio data is input 210 into the communication module 200. The recognizer unit 250 also can receive audio data captured by the recording unit 230. Additionally, the recognizer unit 250 can receive audio data stored at the storage unit 240. In some implementations, the recognizer unit 250 uses a Hidden-Markov speech recognition model.

The data communication link 260 can be implemented as a system bus or a signal line. Audio data and information associated with the audio data can be transmitted on the data communication link 260. The voice command controller 300 can be implemented to receive one or more commands. The one or more commands can be received from a user operating the communication device in which the voice command controller 300 is located.

Figure 3:
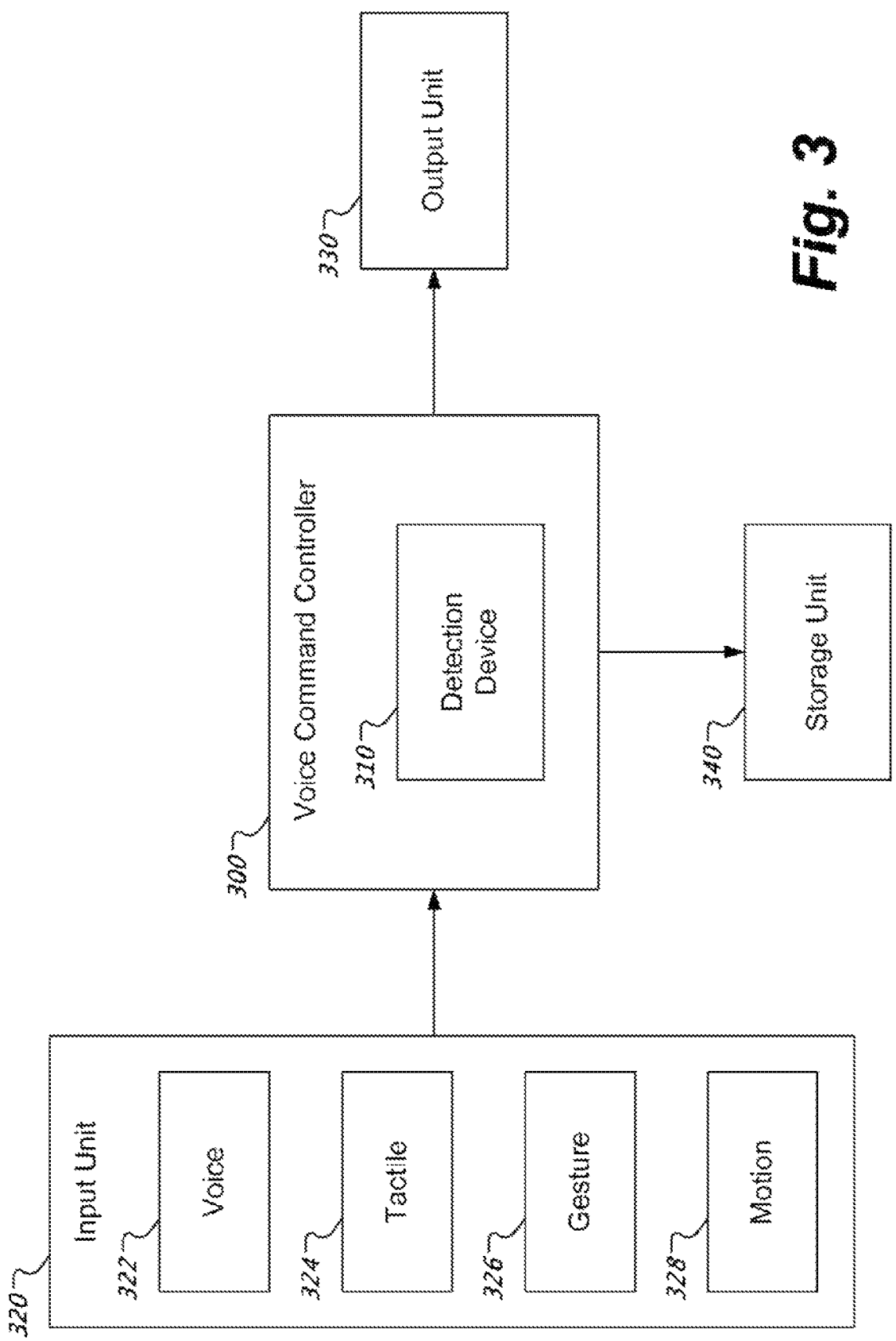
FIG. 3 is a block diagram that includes an example voice command controller.

FIG. 3 is a block diagram that includes an example voice command controller 300. The voice command controller 300 can be implemented to receive input and produce output, and to parse one or more commands from audio data received during a communication session.

In some implementations, the voice command controller 300 differentiates between voice information associated with a phone conversation and one or more voice commands spoken into a microphone operatively coupled to a communication device in which the voice command controller 300 is installed. The voice command controller can be implemented to recognize voice commands spoken by a caller on the near end, e.g., the originating source, from the real-time voice information transmitted during a communication session.

The voice command controller 300 also can be implemented to ignore voice commands spoken by a caller on the far end, e.g., the secondary source, of the phone conversation. The voice command controller 300 includes a detection device 310. The detection device 310 can be implemented to parse one or more voice commands included in audio data received from the local source (i.e., the device user) during the communication session. The one or more voice commands can be received during a connected and active communication session. The voice command controller 300 can receive the one or more voice commands without causing the communication device to switch from a conversational mode to a command mode. In some implementations, the detection device 310 filters out ambient noise during the communication session.

The detection device 310 can be programmed to recognize pre-defined key words and phrases associated with the one or more voice commands. The pre-defined key words and phrases can include words and/or phrases defined by either or both of the manufacturer and one or more device users. For example, the pre-defined key word "phone" can be programmed such that when the detection device 310 detects the key word "phone," the detection device 310 recognizes that the key word is associated with a command and informs the voice command controller 300 that one or more actions corresponding to the command should be taken. Actions performed by the voice command controller 300 can include generating audible, visual or textual data corresponding to the received audio data. For example, the voice command controller 300 can output textual data corresponding to the ten digits associated with the audio data triggering the key word "phone" audio data, in a similar manner as described above with respect to the recognizer unit 250.

The detection device 310 can include a detection filter that recognizes the differences between a voice at the near end of the phone conversation, the local source, and a voice at a far end, a remote source. For example, the detection filter can include speech recognition software based on the Hidden-Markov model that can distinguish between one or more voices during a communication session. In some implementations, audio signals are detected without the detection filter. For example, audio signals received from the near end can be received through a microphone operatively coupled to the communication device and can be routed to the communication module 200.

In some implementations, a dictation recognition system (e.g., a parser) included in the detection device 310 interprets text from a phone conversation. The dictation recognition system can include a text post-processor, or data detector that is configured to parse through the generated text to obtain useful textual information, e.g., target information. Examples of useful textual information include phone numbers, email addresses, dates and home addresses. In some implementations, the useful textual information is highlighted, or otherwise enhanced, such that a user can perform one or more actions on the textual information. For example, a user can click on a phone number that was recognized and highlighted by a data detector, to call the party associated with the phone number.

In some implementations, the detection device 310 can detect and extract useful information from a live or automated conversation and can store the information in an information log. For example, information such as a physical address, an email address, a phone number, a date, and a uniform resource locator can be detected and inserted into the information log. The information log can be implemented as a list or queue of information items recognized during a communication session. For example, the information log can be configured to include information items associated with a list of pre-defined or programmed words and phrases that are detected and identified by the detection device 310 in the course of a communication session. When an item of information is detected, e.g. a phone number, the item of information can be inserted into the information log. Additional information also can be associated with the item of information, such as a time stamp and/or an indication of the item's source. The information log can be displayed, e.g., in a user interface display of a device, such as an interactive device.

The device also can be configured to output a signal, such as a tone or haptic feedback, when a new information item is added to the information log. Each information item can also be associated with an identifier that identifies a particular user or communication device from which the information item was derived. Once added to the information log, an item of information can be acted on, such as through a voice command or tactile input. For example, a phone number recognized during a communication session and added to the information log can be dialed during the communication session, such as to initiate a three-way call. Also, an e-mail address can be accessed to generate a message or message template during the communication session.

The information log also can be accessed after the corresponding communication session ends. For example, a recognized telephone number can be used to initiate a new communication session or an item of contact information can be used to generate a new contact or update an existing contact. One or more items of information included in the information log also can be altered, including through editing and deleting. For example, the spelling of a recognized name can be corrected. A user can also associate particular commands with one or more items of target information.

Further, the information log can be stored to permit subsequent retrieval and processing. For example, a link to the information log corresponding to a communication session can be included in a call history list or a file structure, such as a folder or directory.

In some implementations, an audio recording of the communication session is accessed in conjunction with the information log, such as for verification of one or more recognized information items. In addition, a time stamp associated with an information item can be used to access the corresponding portion of the audio recording, permitting the information item to be compared with the corresponding recorded audio.

The detection device 310 can be implemented to process the one or more voice commands concurrent with the phone conversation. The one or more voice commands also can be recorded and time stamped by the detection device 310 for later execution. The recorded time stamped voice commands can be stored and displayed in a command list in, e.g., a user interface display. The detection device 310 also can record and time stamp the detected key words associated with the one or more voice commands. The recorded time stamped key words further can be stored and displayed in an information log. In some implementations, the information log and the command list can be integrated.

The voice command controller 300 can receive input from an input unit 320. The input unit 320 can be implemented to provide one or more types of input to the voice command controller 300. The input received from the input unit 320 can include one or more of: voice input 322; tactile input 324; gesture input 326; and motion input 328. The voice input 322 can include one or more voice commands directing the voice command controller 300 to perform one or more actions corresponding to the one or more voice commands.

For example, the voice input 322 can include a command to the voice command controller 300 to prepare an electronic message for dissemination to a particular person. Upon receipt of the command, the voice command controller 300 can be implemented to generate a shell electronic message to a particular contact named as a part of the command. For example, in response to a command to prepare an email for "Greg," the voice command controller 300 can generate an email addressed to Greg.

The voice input 322 also can include a command to initiate dictation, e.g., to generate an information log that is not associated with a particular communication session. For example, the voice command controller 300 can be implemented to transcribe and record Greg's email address as Greg's email address is dictated into the phone. The voice command controller 300 also can be implemented to read and recite stored information. For example, during a phone call with "Bob," the near end user can provide voice input 322 commanding the voice command controller 300 to "recite Greg's phone number"; in response to receiving the voice input 322, the voice command controller 300 can produce output 330 reciting Greg's phone number that is audible to Bob, the near end user, or both.

The tactile input 324, gesture input 326 and motion input 328 can be implemented as physical inputs. The physical inputs can be used in conjunction with the voice input 322 to differentiate the one or more voice commands, e.g., commands, from the real-time voice information, including target information. The physical inputs can be received before, concurrently with, or after the voice input 322, i.e., one or more voice commands, is received. For example, as a user speaks one or more voice commands into the communication device, the user also can press a button located on the communication device to indicate that the spoken words are distinct from regular voice information associated with the phone conversations and should be treated as a command.

Tactile input 324, such as pressing a hardware, virtual or soft button, also can be used to determine whether one or more voice commands should be treated as a string of commands, or distinguished as separate individual commands. Gesture input 326, such as gesturing with one or more fingers while holding the communication device in the gesturing hand, also can be used to indicate that spoken words should be treated as a command, in addition to determining the difference between a string of commands and separate individual commands.

Additionally, motion input 328, such as moving or shaking the communication device, also can be used to indicate that spoken words should be treated as a command, as well as determining the difference between a string of commands and separate individual commands. In some implementations, the voice input 322, as well as the physical inputs, can cause one or more processors at the voice command controller 300 to generate a new file corresponding to the received input. In some implementations, the physical inputs can be the sole input instructing the voice command controller 300 to perform the one or more actions corresponding to the received input.

The voice command controller 300 can produce output at an output unit 330. The output unit 330 can be implemented to provide one or more types of output from the voice command controller 300. The output unit 330 can include producing textual data corresponding to the received audio data. The textual data can be displayed on a display screen of, e.g., the communication device 120 depicted in FIG. 1. For example, in response to receiving voice input 322 directing the voice command controller 300 to perform an action, the voice command controller 300 can instruct the output unit 330 to produce textual data corresponding to the received voice information on the touch screen of, e.g., a smart phone. The output unit 330 also can produce audible and visual data based on the one or more actions performed by the voice command controller 300 in response to the one or more voice commands. In some implementations, the output unit 330 can be used to provide the output 220 depicted in FIG. 2.

Output from the voice command controller 300 can be stored in a storage unit 340. In some implementations, the storage unit 340 can be integrated physically and/or logically with the storage unit 240. In other implementations, the storage unit 340 can be both physically and logically separate from the storage unit 240. The storage unit 340 can be implemented to store information associated with the one or more actions taken by the voice command controller 300. For example, in response to receiving voice input 322 from a user directing the voice command controller 300 to "remember the phone number" recited by the caller on the far end, the voice command controller 300 can produce textual data corresponding to the phone number at the output unit 330 and also can store the phone number at the storage unit 340. The storage unit 340 can be implemented as the storage unit 240 in the communication module 200 depicted in FIG. 2. The storage unit 340 can be configured as a local storage device or local memory cache. In some implementations, the storage unit 340 can be located remotely from the communication device 120 depicted in FIG. 1. For example, the storage unit 340 can be located on a server maintained by a network provider. In some implementations, upon detecting particular pre-defined words and phrases, such as numbers, the communication module 200 can transmit a portion, or the entirety, of the particular audio data to a remote server. The dedicated server can be configured to recognize particular programmed utterances with greater clarity, and also can store the audio data. in some implementations, the server can transmit the clarified detected utterance to the communication device.

Figure 4:
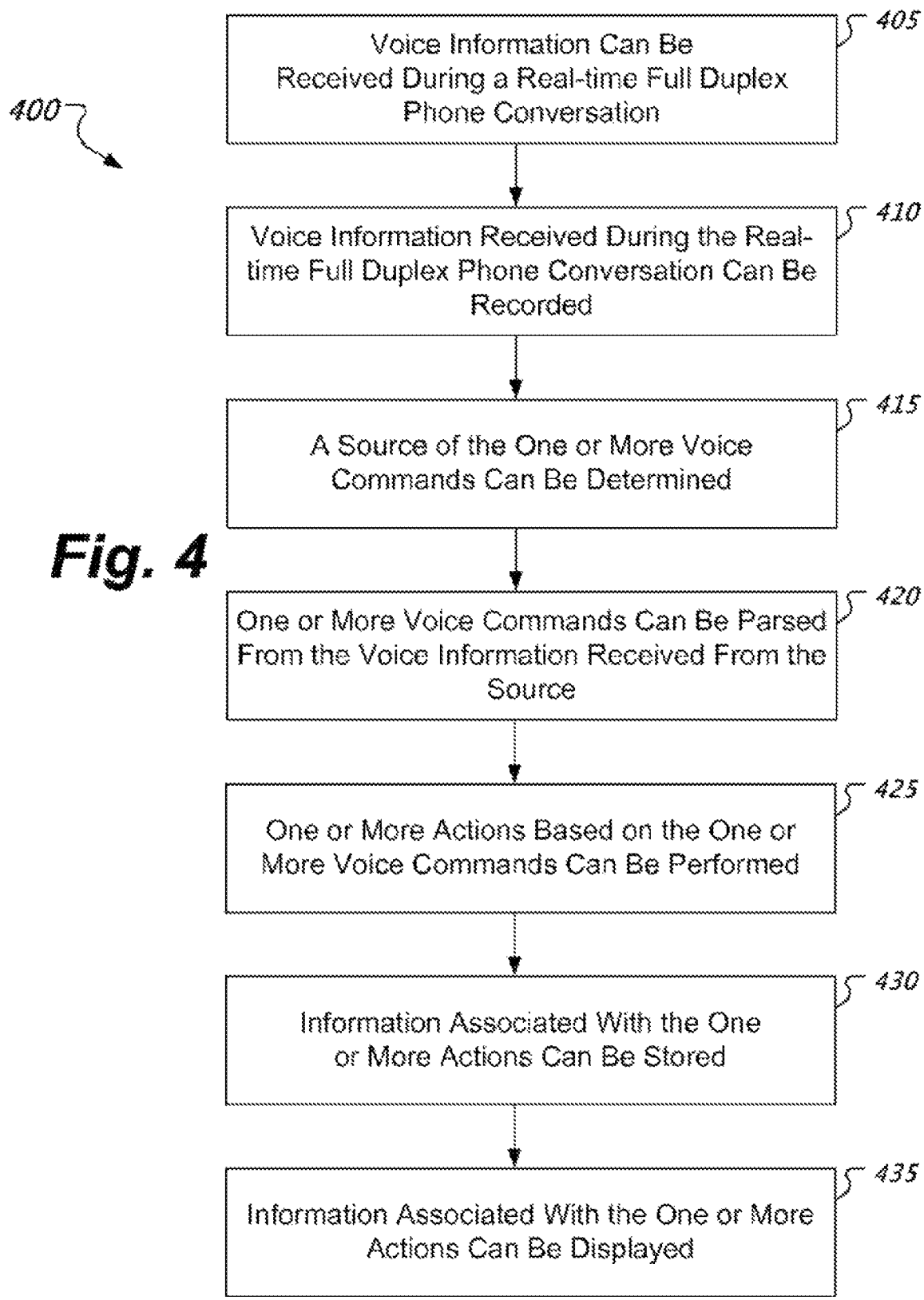
FIG. 4 is a flow chart showing an example process for performing actions in response to voice commands.

FIG. 4 is a flow chart showing an example process for performing actions in response to voice commands. The process 400 can, for example, be implemented in the communication devices 110, 120 depicted in FIG. 1, the communication module 200 depicted in FIG. 2 and the voice command controller 300 depicted in FIGS. 2-3.

Voice information, including one or more voice commands, can be received during a real-time full duplex phone conversation or from a voicemail left for the user by a caller (as described above in relation to FIG. 1) (405). The voice information can be received by a communication device. The communication device can be a mobile phone or other verbal communication device. The real-time full duplex phone conversation can be a bidirectional communication session. A user operating the mobile phone can speak the one or more voice commands into the mobile phone during the communication session and the mobile phone can identify or parse the commands from the conversation. The one or more voice commands can direct the communication device to take one or more actions corresponding to the one or more voice commands.

In some implementations, the one or more voice commands can be received after the communication session has ended. For example, at the conclusion of a communication session, a user can instruct the communication device to take an action based on information received during the communication session. In some implementations, the one or more voice commands can be accompanied by tactile, gesture or motion input. The tactile, gesture and motion input can be associated with the one or more voice commands and can be used to differentiate the one or more voice commands from other portions of the phone conversation. The accompanying input also can be received by the communication device during an active communication session or after the communication session has ended.

Voice information received during the real-time full duplex phone conversation (or voicemail) can be recorded (410). The voice information can be received by the communication device. The voice information can be encoded in digital audio data. The recording can occur automatically, or in response to input initiating the recording. In some implementations, the voice information can be continuously monitored during a real-time communication session, including a bidirectional communication session. The voice information also can be recorded continuously for the duration of the real-time full duplex phone conversation.

A source of the one or more voice commands (or keywords) can be determined (415). A speech recognition algorithm, such as the Hidden-Markov model, implemented in a detection device can filter voice information in audio data to determine the source of the one or more voice commands. In some implementations, the source can be the caller operating the communication device, e.g., the originating source.

The one or more voice commands (or keywords) can be parsed from the audio data received from the source (420). Two or more users operating communication devices can participate in the communication session. For example, the communication session can include a telephone conversation between two or more users operating smart phones. Audio data can include any and all voice information exchanged during the telephone conversation. The one or more voice commands can be detected by a detection module in the communication device.

In some implementations, the detection module can be located external from the communication device. The detection module can be implemented to identify the one or more voice commands in the voice information received from the source during the real-time full duplex phone conversation. For example, the detection module can identify key words and phrases associated with the one or more voice commands, such as "phone, remember that street address," from the remainder of the telephone conversation. The detection module can extract the information associated with the one or more voice commands and can manage the extracted information differently than the received audio data.

One or more actions based on the one or more voice commands (or keywords) can be performed (425). The one or more voice commands can cause a processing module (see, e.g., FIG. 5) at the communication device to perform one or more actions corresponding to the one or more voice commands. The one or more actions can include generating textual data corresponding to the voice information received during the real-time full duplex phone conversation. For example, the processing module can produce textual data corresponding to the street address recited by the caller on the other end of a telephone conversation. The one or more actions also can include generating audible or visual data corresponding to the audio data received during the communication session. For example, in response to a voice command directing the communication device to "repeat the street address," the processing module can produce audible data corresponding to the street address recited during the communication session. In some implementations, audio data received during the communication session also can be provided to one or more applications. For example, audio data received during a communication session can be used to populate one or more fields of an electronic mail message or inserted into a contact record. Further, audible data also can be provided to another device, such as another device participating in the communication session.

Information associated with the one or more actions can be stored (430). The information associated with the one or more actions can be stored in a storage unit located within or outside the communication device. For example, the storage unit can be implemented as a local storage device or local memory cache within the communication device. In some implementations, the information can be stored in a particular location of the storage unit based on the one or more commands. For example, in response to a voice command directing the communication device to "store the street address in my contacts folder," the processing module can store the audio data corresponding to the street address in the contacts folder portion of the storage unit. In some implementations, physical commands can be used to direct the communication device to perform one or more actions. For example, a user can interact with, e.g., touch or press, a command button in an communication device user interface to store the street address in the contacts folder.

Information associated with the one or more actions can be displayed (435). For example, the generated textual data corresponding to the voice information recorded during the real-time full duplex phone conversation can be displayed in, e.g., a user interface of a data processing apparatus (e.g., a smart phone, an interactive device, or other electronic devices with display components). The information associated with the one or more actions also can include the corresponding voice commands and key words. In some implementations, the information can be presented in an information log.

Figure 5:
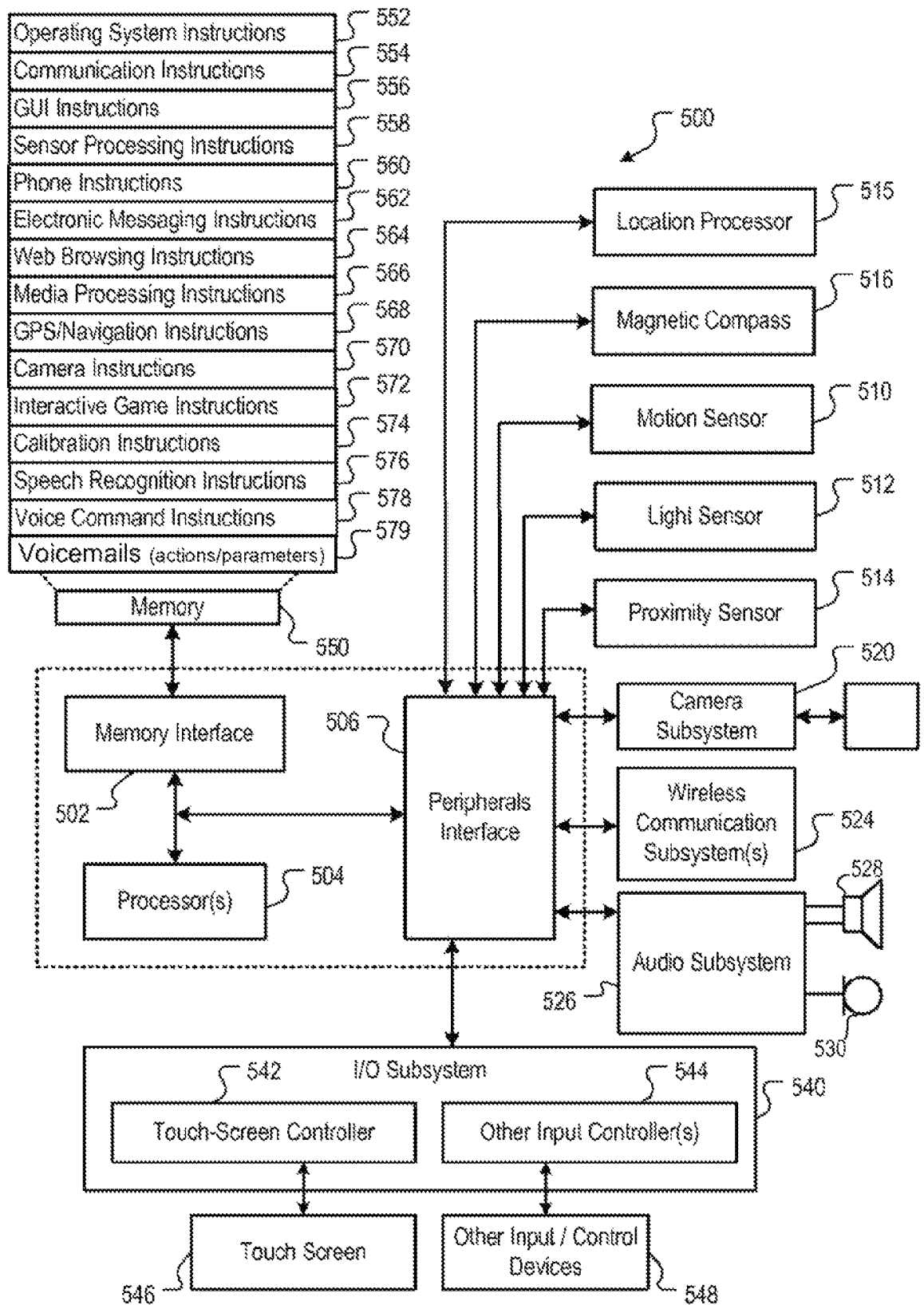
FIG. 5 is a block diagram illustrating an example architecture of an interactive device that can be utilized to implement the systems and methods described herein.

FIG. 5 is a block diagram illustrating an example architecture of an interactive device 500 that can be utilized to implement the systems and methods described herein. The interactive device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. Various components in the interactive device 500 can be coupled together by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. A location processor 515 (e.g., GPS receiver) can be connected to the peripherals interface 506 to provide geopositioning. A magnetic compass integrated circuit 516 can also be connected to the peripherals interface 506 to provide orientation (e.g., to determine the direction of due North).

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the interactive device 500 is intended to operate. For example, an interactive device 500 can include communication subsystems 524 designed to operate over a wireless network, such as a GSM network, a GPRS network, an EDGE network, a Wi-Fi or WiMax network, and a Bluetooth™ network, or a wired network. In particular, the wireless communication subsystems 524 may include hosting protocols such that the device 500 may be configured as a base station for other wireless devices.

An audio subsystem 526 can be coupled to a speaker 528 and a microphone 530 to facilitate voice-enabled functions, such as voice recognition, voice replication, digital recording, and telephony functions. The I/O subsystem 540 can include a touch screen controller 542 and/or other input controller(s) 544. The touch-screen controller 542 can be coupled to a touch screen 546. The touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 546.

The other input controller(s) 544 can be coupled to other input/control devices 548, such as one or more buttons, rocker switches, thumb-wheel, infrared port, LISS port, and/or a pointer device such as a stylus. The one or more buttons (not shown) can include an up/down button for volume control of the speaker 528 and/or the microphone 530.

In one implementation, a pressing of the button for a first duration may disengage a lock of the touch screen 546; and a pressing of the button for a second duration that is longer than the first duration may turn power to the interactive device 500 on or off. The user may be able to customize a functionality of one or more of the buttons. The touch screen 546 can, for example, also be used to implement virtual or soft buttons and/or a keyboard.

In some implementations, the interactive device 500 can present recorded audio and/or video files, such as MP3, AAC, and MPEG files. In some implementations, the interactive device 500 can include the functionality of an MP3 player.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks. The operating system 552 may include instructions for handling basic system services and for performing hardware dependent tasks. In some implementations, the operating system 552 can be a kernel (e.g., UNIX kernel). The memory 550 may also store communication instructions 554 to facilitate communicating with one or more additional devices, one or more computers and/or one or more servers.

The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic messaging related processes and functions; web browsing instructions 564 to facilitate web browsing-related processes and functions; media processing instructions 566 to facilitate media processing-related processes and functions; GPS Navigation instructions 568 to facilitate GPS and navigation-related processes and instructions; camera instructions 570 to facilitate camera-related processes and functions; interactive game instructions 572 to facilitate interactive gaming; calibration instructions 574 to facilitate calibrating interactive devices; speech recognition instructions 576 to facilitate recognizing speech; voice command instructions 578 to facilitate detecting and distinguishing voice commands or keywords, as described in reference to FIGS. 1-4 and FIGS. 7-9, and voicemail messages 579. In some implementations, the GUI instructions 556 and the media processing instructions 566 implement the features and operations described in reference to FIGS. 1-4.

In some implementations, the voicemail messages 579 are stored locally in memory 550, while in other implementations, voicemail pointers are stored in memory 550, where the pointers point to voicemail messages stored on a remote sever. In some implementations, the voicemail messages 579 are audio recordings of voicemail messages left for the user of the device by one or more callers. In other implementations, the voicemail messages 579 are text files of audio messages that have been converted from speech to text by the speech recognition instructions 576. In some implementations, the voice commands or keywords detected by the voice command instructions 578 are an action and one or more associated action parameters as described in further detail in relation to FIGS. 7-9 below.

The memory 550 may also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the interactive device 500 may be implemented in hardware and/or in software, including in one or more signal processing and/or application specific integrated circuits.

Figures 6A, 6B:
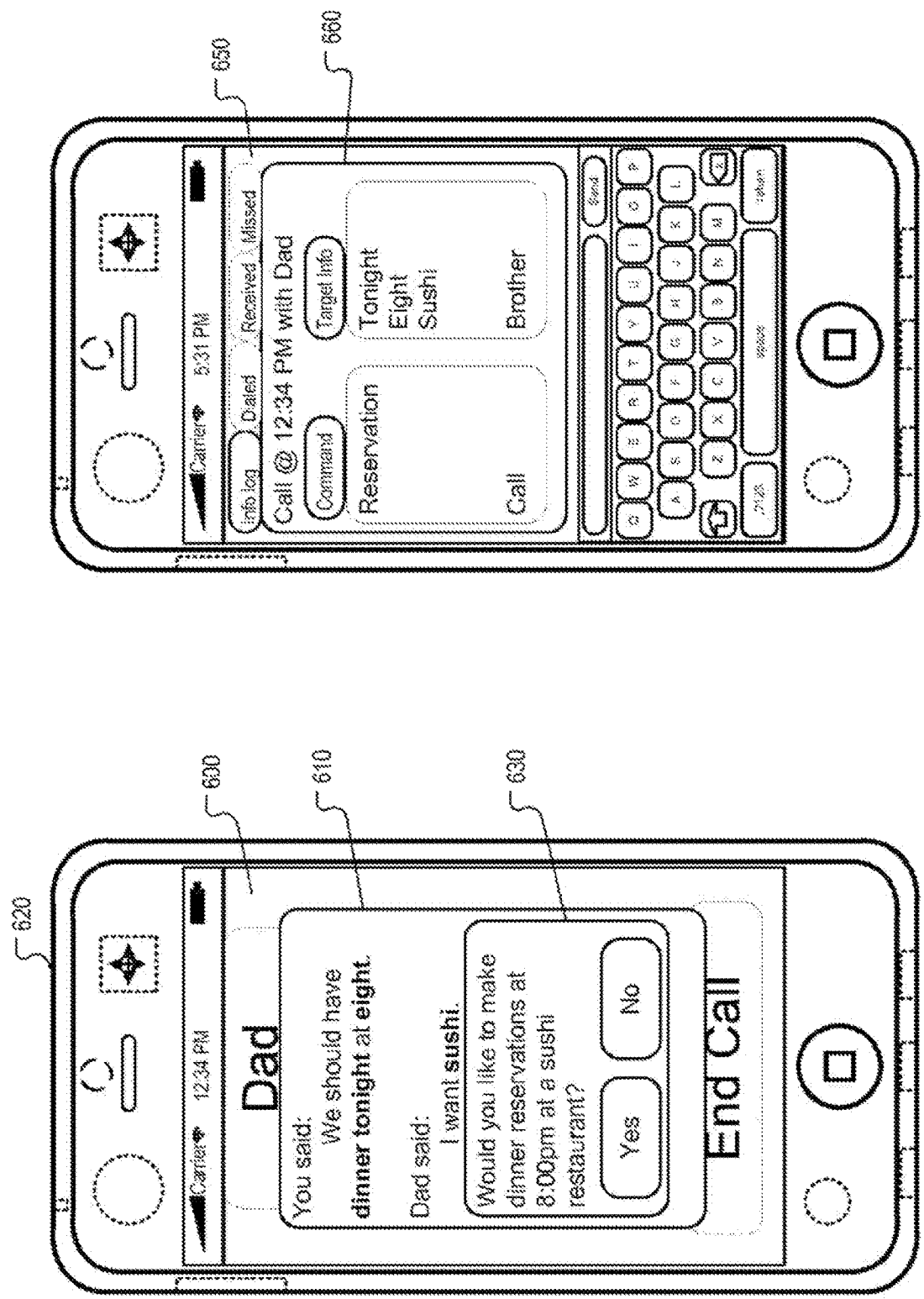
FIG. 6A is a screenshot that includes an example user interface.
FIG. 6B is a screenshot that includes another example user interface. Like reference numbers and designations in the various drawings indicate like elements.

FIG. 6A is a screenshot that includes an example user interface 600. In particular, the user interface 600 displays a transcript 610 of a conversation, e.g., the example conversation described above with respect to FIG. 2, that is currently occurring between the user of communication device 620 and another user "Dad", as indicated by the label "Dad" and a user interface element "End Call" configured to end the communication session. Note that particular words, e.g., key words, in the transcript 610 are enhanced, as illustrated in FIG. 6A by bold formatting. A suggestion 630, in the form of visual feedback, is generated based on the key words and displayed in the user interface 600. In the example, if the user selects "Yes", the key words can be sent to a restaurant reservation service to obtain available reservations.

FIG. 6B is a screenshot that includes another example user interface 650. The user interface 650 displays an example information log 660. Note that, in some implementations, the information log can be rendered in a similar manner as other logs, e.g., logs for dialed calls, received calls, missed calls, are displayed in the communication device 620. In the example, identified commands and suggested commands, e.g., "Reservation" and "Call" are displayed in a first column of the information log 660. Identified target information, e.g., "Tonight", "Eight", "Sushi", "Brother" is displayed in a second column that is adjacent to the first column.

In some implementations, each call in a call log, e.g., the logs for dialed calls, received calls, and missed calls, that has an associated information log can have a selectable interface element (e.g., a virtual button such as a chevron (>>rendered next to a call). A user selection of the selectable interface element causes a respective call log to be displayed in the communication device 620. As an example, the call log can be displayed in a pop-up window that is superimposed over the call log.

Associations between target information and particular commands can be indicated by aligning a particular command with associated target information. In FIG. 6B, the command "Reservation" to request a reservation can be performed on one or more of the target information items "Tonight", "Eight", and "Sushi." Similarly, the command "Call" can be performed on the target information item "Brother." The user interface 650 also includes a virtual keyboard, e.g., a virtual representation of a keyboard that facilitates editing of the information log 660 as described above.

As described above, these same systems and methods can be applied to recorded information, like voicemail messages. The systems and methods may be implemented on the device itself, on a remote server, or on a combination of the device and a remote server. Further details of such a system are also described in U.S. Provisional Application Ser. No. 61/646,831, filed May 14, 2012, which is incorporated by reference herein.

Figure 7:
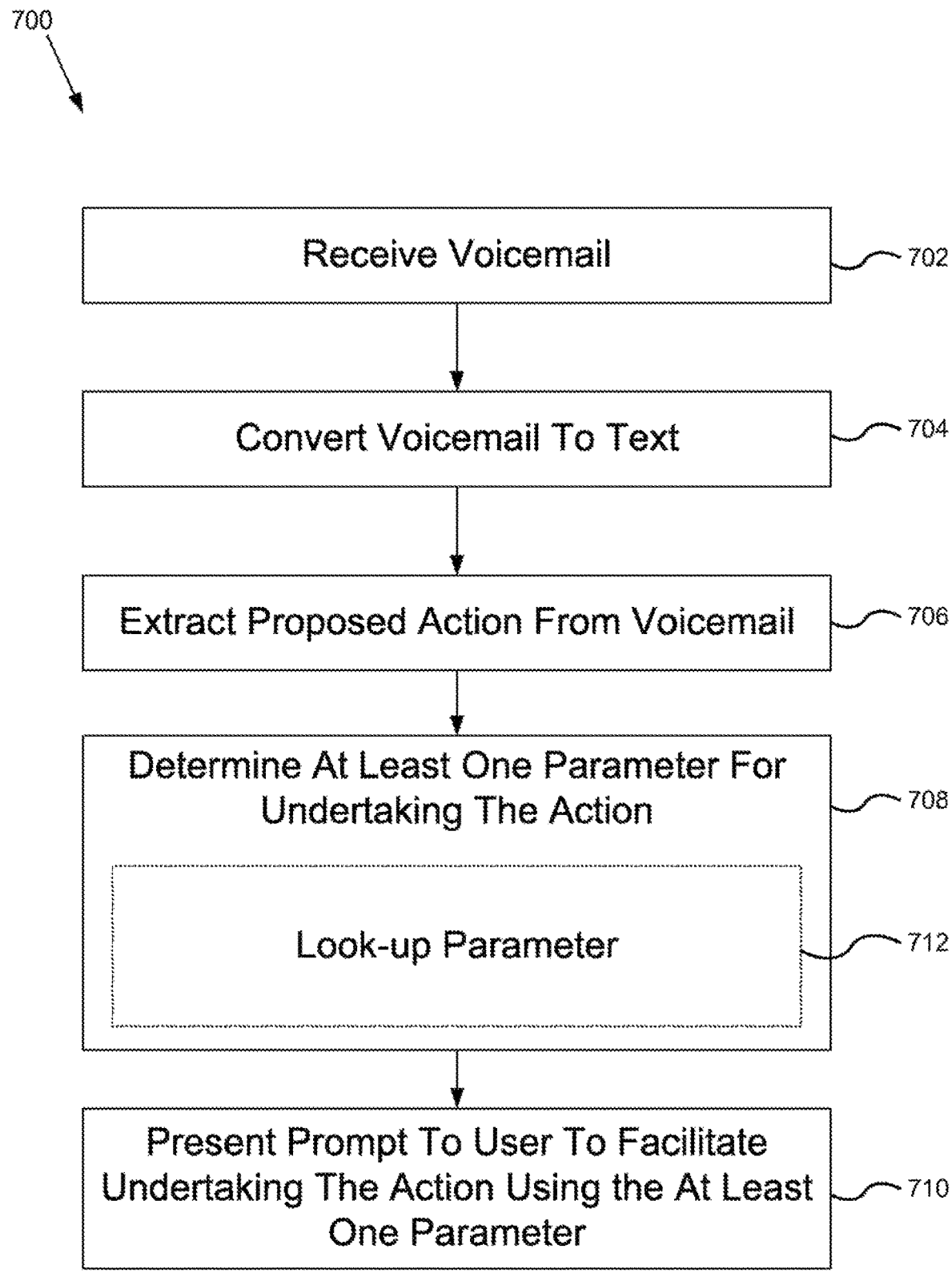
FIG. 7 is a flow chart of an exemplary method for operating a digital assistant to automatically act on incoming voicemail messages received on a user's interactive device.

FIG. 7 is a flow chart of an exemplary method 700 for operating a digital assistant to automatically act on incoming voicemail messages received on a user's interactive device. In some implementations the interactive device is a user's mobile device, like a smartphone, such as that described in relation to FIG. 5. Initially, recorded voice messages (e.g., voicemail messages) are provided (702) from one or more callers to a user of the device. For example, the device receives one or more voicemail messages 579 of FIG. 5. In some implementations, these voicemail messages are audio files of recorded voice messages, while in other implementations they are pointers to audio recordings stored on a remote server.

In some implementations, the recorded voice messages are then converted (704) from speech to text. In some implementations, this conversion occurs automatically without user intervention as soon as the voicemail message is received at the device, while in other implementations, this occurs at any other suitable time, e.g., when the device has processing cycles to spare.

hereafter, a number of steps occur automatically without user intervention. First, a proposed action to be performed by the user is extracted (706) from the voice message. In some implementations, the voice command instructions 578 of FIG. 5 extract the proposed action from the converted text of the voicemail message as described above. For example, the voicemail message may state the following: "John, please can you email me a copy of yesterday's presentation." The voice command instructions 578 of FIG. 5 determine the proposed action is to send the caller an email message. In other words, the action proposed by the caller is to email the caller with certain information.

Second, at least one action parameter for undertaking the action is determined (708). The action parameters are any parameters that are necessary or optional for performing or undertaking the action. For example, in the above example, the action parameters are the caller's email address and "yesterday's presentation." Both of these parameters may be required for performing or undertaking the action of sending via email a copy of yesterday's presentation to the caller. In some implementations, the one or more action parameters are also extracted from the voice message.

Figure 8:
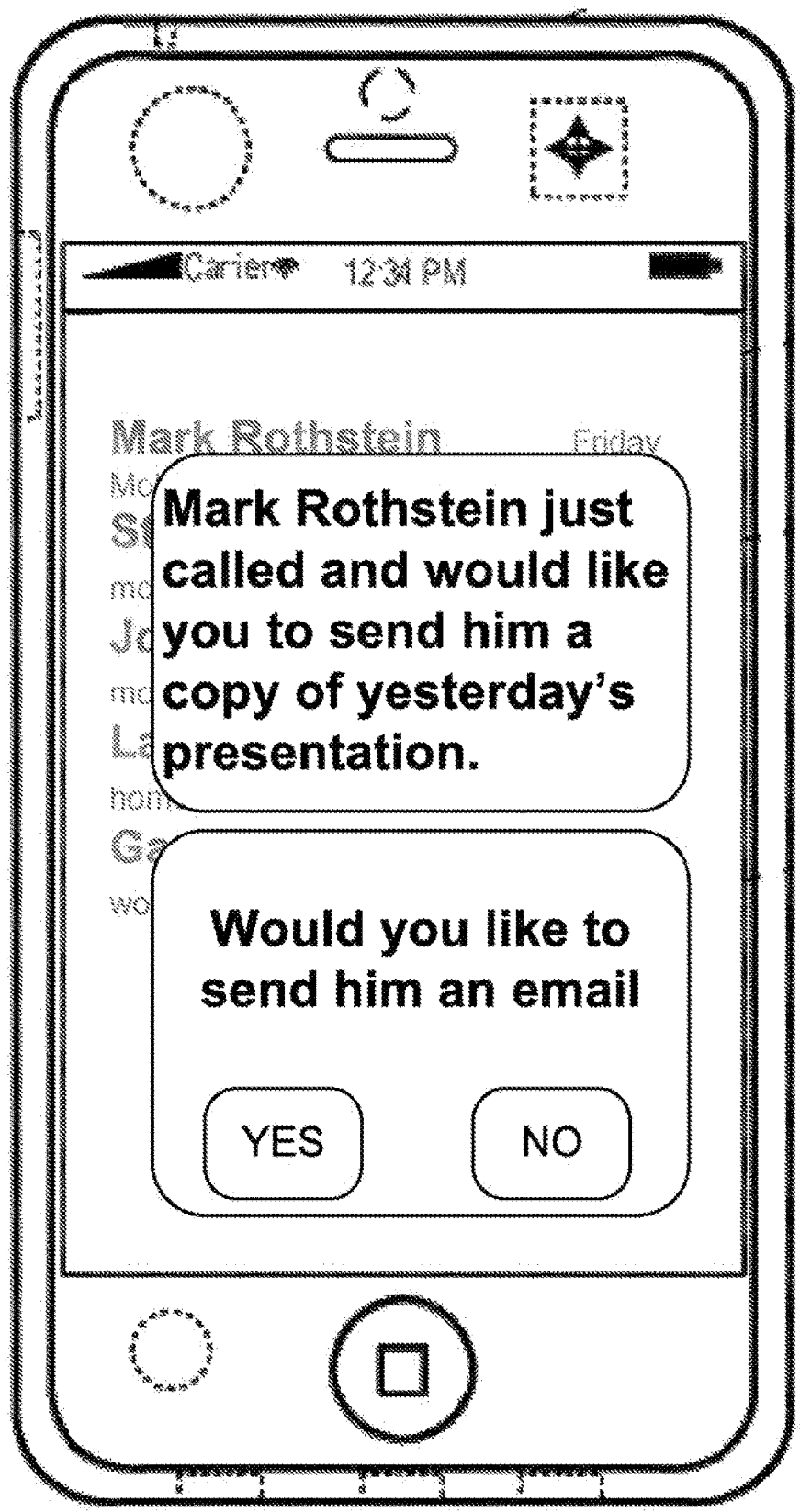
FIGS. 8 and 9 show exemplary screenshots of presented to a user.
Figure 9:
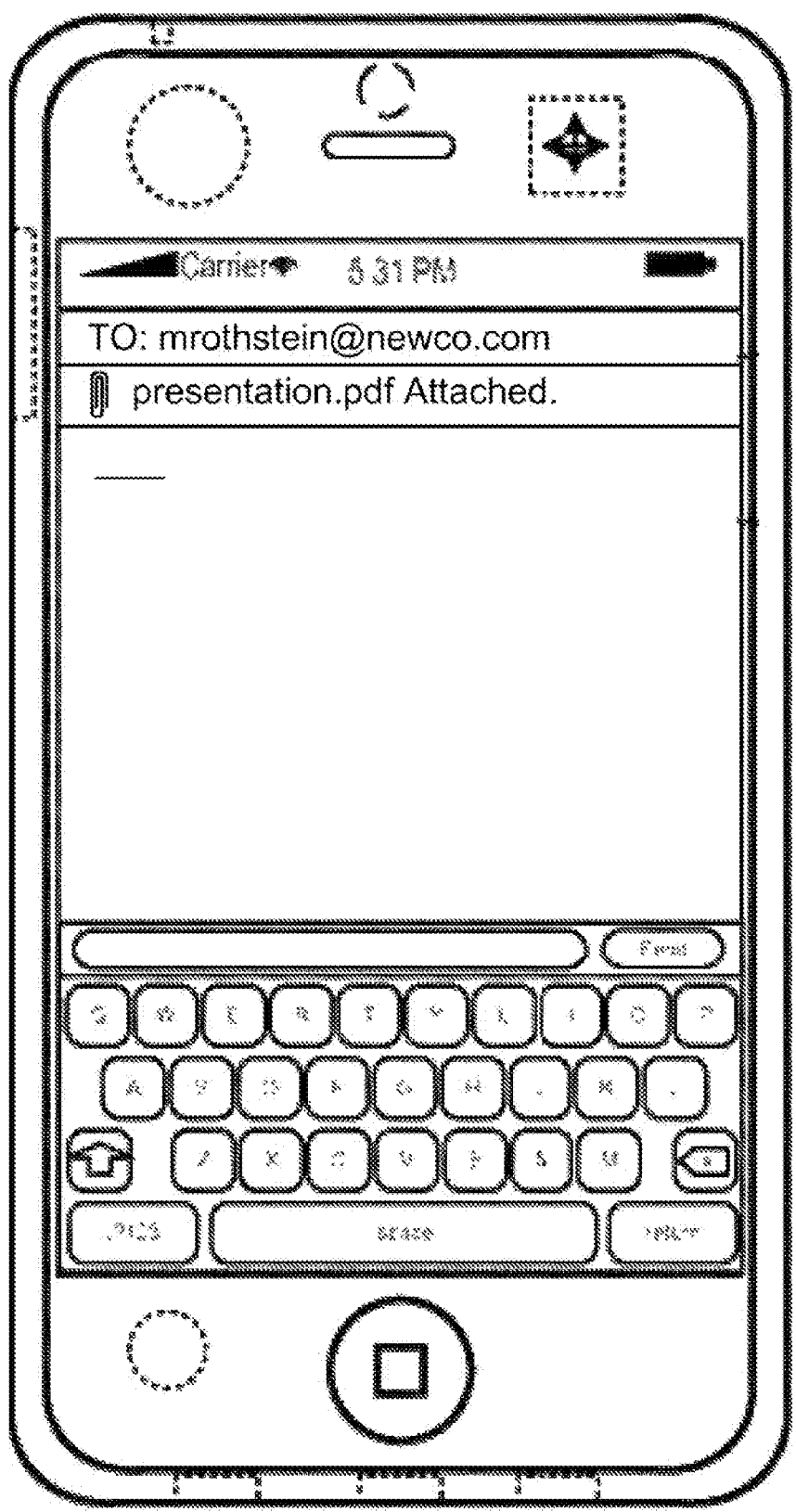

Finally, the user of the device is presented (710) with a prompt facilitate undertaking the action using the at least one the parameter. Completing the example above, the voice command instructions 578 of FIG. 5 presents the user with an option to send the caller an email_ An example of such a prompt is shown in FIG. 8. If the user selects to send the caller an email, a draft email is generated as shown in FIG. 9.

Some examples of actions and action parameters include:
1. Action: calling the caller back;
    Action parameter: the caller's name, telephone number, time to call back, date to call back, etc.
2. Action: calling another person (not the caller);
    Action parameter: the person's name, telephone number, time to call back, date to call back, etc.
3. Action: sending an email message to the caller (or another person); Action parameter: caller's/person's name or email address; content of the email message, a desired attachment, a time to email, a date to email, etc.
4. Action: sending a message (e.g., SMS) to the caller (or another person); Action parameter: caller's/person's name, email address or phone number; content of the message, a desired attachment, a time or date to send the message, etc.
5. Action: visit a webpage;
    Action parameter: the webpage's uniform resource locator (URL) name of the webpage or website, etc.
6. Action: watch a online video;
    Action parameter: an identifier or name of the video; a URL of the video; etc.
7. Action: a recommendation to download or purchase a software application; Action parameter: the name or location of the application, etc.
8. Action: to remember to do something (i.e., a reminder); Action parameter: the name of the task to be performed; the time period (e.g., time of day and date) that the task should be performed.
9. Action: to perform a task;
    Action parameter: the task to be performed;
10. Action: to enter a calendar entry;
    Action parameter: task name, date/time, etc.
11. Action: to meet;
    Action parameter: meeting name, location, time/date, etc.
12. Action: to lookup or go to (navigate to) to a specific geographic location; Action parameter: location, etc.
13. Action: adding contact details to the user's contact book;
    Action parameter: contact details.
14. Action: checking on the user's availability;
    Action parameter: time period (date and time).

In those implementations where the action is to call or send a text message to the caller or another person (e.g., "Dave, mom asked that you call her tonight"), a telephone number is required. If the telephone number is provided in the voicemail message, then that number may be used to call the caller/person. If a number is not provided (see example above), then the number (action parameter) is first obtained from the user's contact or address book. For example, if the voicemail is to call "mom" and no number is provided, then a search is performed (712) of the user's contact book for an entry matching "mom, "mother", etc. The same method can be performed for any other contact details, such as an email address, physical address, alternative phone numbers, etc. Similarly, any other action parameter may be looked-up in the same way. For example, a URL, calendar entry, application identifier, online video, etc., may all be looked-up based on another action parameter extracted or inferred from the message (e.g., "look at today's WALL STREET JOURNAL" may initiate a search for a URL associated with "WALL STREET JOURNAL"). For example, if the voice mail says "Check out the XYZ website for Linda's new profile" without specifying the URL of the website, the URL of the XYZ website is looked-up and displayed to the user in a user interface element (e.g., a hyperlink) for accessing the website from the voicemail interface.

In some implementations, a source telephone number of the caller may be obtained from automatic caller identification, performing a reverse lookup etc. In other implementations, an existing contact is identified in a contact list or book associated with the user based on at least one of a source telephone number from which the recorded voice message originated and a name extracted from the recorded voice message.

In the implementations where the action is to send an email, the at least one action parameter is an email address of the caller, and the prompt presents the user with an option to send an email message to the email address. For example, the voicemail message may say "Dave, please can you email me at mark@newco.com to let me know if you are coming for dinner." The at least one parameter is the email address (markgnewco.com) of the caller. If the email address is not given by the caller, e.g., "Dave, please can you email me to let me know if you are coming for dinner," then the email address is obtained by first determining the name of the caller from caller identification (or any other means), and thereafter looking up the person's name in the user's contact book to locate an address. A prompt is then presented to the user with the option to email the caller. For example, in a voice mail retrieval user interface, the user is requested to confirm that he wants an email prepared to the caller's email address. Upon user confirmation by the user, a draft email is presented to the user, where the email includes the email address as a destination address (e.g., pre-populated into the "to" field).

In some implementations, a prompt presents the user with an option to store an email address extracted from the recorded voice message in the user's contact book (or update an existing contact entry). If the identity of the person leaving the voicemail message can be ascertained from the source phone number, or the voice mail message, the device optionally supplements existing contact information of the contact based on the email address left in the voice mail. In another implementation, the prompt provides the user with the option to store any other contact detail extracted from the voicemail message in the user's contact book. For example, where Mr. Smith calls from his office phone, and says "This is Kevin Smith, please call me at my cell 650-888-5889", the device finds an existing contact "K. Smith" in the user's contact list with an office phone number different from the number left in the voicemail message, the device offers to store the number "650-888-5889" as an additional contact number for the contact "K. Smith."

In some implementations, a transcript of the recorded voice message is also included in the body of the message, so that the user can easily see what they need to respond to, e.g., a question from the caller.

In implementations where a caller has left a voicemail about a previous email sent to the user, and where the user requests the user to write back, the user is presented with the option to prepare a reply email to the previously received incoming email mentioned in the recorded voice message. Upon user confirmation, a draft reply email to the incoming email mentioned in the recorded voice message is presented to the user.

In those implementations where the action is to send the caller certain information in a text message, e.g., and SMS message, the at least one parameter is a telephone number or email address of the caller. Here, the prompt presents the user with an option to send a text message to the telephone number or email address.

In some implementations where contact details are mentioned in the voicemail and other contact details exist for the same person in the user's contact book, the user may be presented with (i) only one or the other of the contact details, or (ii) the option to respond using one of multiple contact details. For example, if a caller leaves a callback number that is different from the source phone number, the device presents a user interface element to call either the callback number extracted from the voicemail message or the source phone number. In some implementations, the user interface element includes a "CALL" or "SEND" button or icon followed by the person's name or contact details. In another example where a caller has left a callback number that is different from the source phone number logged for the voicemail message, the device presents a user interface element to call the callback number extracted from the voicemail message, rather than the source phone number for the voice mail message. In some implementations, a determination is first made that the source phone number is a masked phone number (e.g., a company's main phone number), when choosing to not to display an option to call the source telephone number.

In some implementations, the prompt to the user is a speech prompt. In these implementations, the prompt is first generated as text. The prompt is then converted from text to speech, where after it is played to the user.

In the implementations where the action is to visit an online application store, the at least one parameter is a name of an application. Here, the prompt presents the user with an option to visit a page associated with the application at the online application store.

In the implementations where the action is to watch an online video, the at least one action parameter is a name of an online video. The prompt presents the user with an option to watch the online video. In some implementations, the device determines the correct video portal directly from the voice mail message. In some implementations, the device searches for the video mentioned in the message on one or more major or preferred online video portals beforehand, and presents the video from a suitable source that has been identified. In some implementations, the device merely takes the user to a default video portal, and enters the search for the user. The user can then browser through the search results that are returned. For example, after the user has viewed the video, the device presents an option for the user to callback the caller to discuss his/her opinions of the video. In some embodiments, the device determines the telephone number associated with the caller based on the contact list of the user, or the source phone number of the voice mail message.

In some implementations, instead of calling the caller, the device also allows the user to contact the caller via a text or email message.

In implementations where the action is to meet at a specified geographic location, the at least one action parameter comprises a name or an address of the geographic location. In some implementations, presenting the prompt further comprises presenting an option to the user to provide navigation to the specified geographic location. In some implementations, presenting the prompt further comprises presenting the user with an option to store the specified geographic location as a reminder or calendar entry. In some implementations, the at least one action parameter also includes a time period and the prompt presents the user with an option to store a reminder or calendar entry for meeting at the specified geographic location at the time period. For example, a reminder for "meet me at Pizza Hut in Cupertino in an hour" is created for the user.

In some implementations, the action is to perform a task at a later time, and the at least one action parameter is an action and a time for the task. Here, the prompt presents the user with an option to store a reminder to perform the task at the time. For example, if the voice mail message says, "This is mom, please call me tonight." The device prepares a reminder to call a number associated with "mom" at 8 pm that night. The time of 8 pm may be arbitrarily chosen for "tonight" or a time that the user normally makes calls to mom in the evening is used instead. In another example, if the caller left a message at 4:30 pm saying "meet me at Pizza Hut in Cupertino in an hour" and the user did not look at the device until 6:30 pm, the device offers an option to call the caller immediately, without setting a reminder.

It may also be determined whether the recorded voice message requires immediate attention from the user based on the action and the at least one action parameter. If it is determined that the recorded voice message requires immediate user attention, the prompt is immediately presented to the user. However, if it is determined that the recorded voice message does not require immediate user attention, the prompt is presented to the user at the time that the user accesses the recorded voice message. For example, if the caller left a message at 4:30 pm saying "meet me at Pizza Hut in Cupertino in an hour" and the device detects that the user has not checked his voice mail at 4:00 pm, the device proactively presents a prompt for the user to review the voice mail message, and optionally provides the user directions to the location of the meeting.

In implementations where a time is provided in a voice-mail message, the system may first determine the address of the caller from the user's contact book, and then determine the appropriate time taking time zones into account. For example, the voicemail may state "this is John Goodman, call me at work at 1 pm." Here the system determines that John Goodman lives in California, while the user lives in Virginia; and offers to set a reminder to call John Goodman at 4 pm EST (1 pm PST) the following day.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a data processing apparatus, or programmable system including at least one programmable processor, which may be special or general purpose, coupled to receive data and instructions from, and to transmit data and instructions to, a storage system, at least one input device, and at least one output device.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, a keyboard, and a pointing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

What is claimed is:

1. A method of operating a digital assistant, comprising:
   at a device having one or more processors and memory:
     providing a recorded voice message from a caller to a user; and
     automatically, without user input:
       extracting from the voice message a proposed action to be performed by the user, wherein extracting the proposed action comprises determining the proposed action from a plurality of proposed actions, wherein the proposed actions include at least one of: calling back the caller, calling a person other than the caller, storing contact details in a contact book of the user, sending an email to the caller, sending a text message to the caller, visiting a webpage, watching an online video, recommending to download or purchase a software application, reminding to perform a task, performing a task, entering a calendar entry, attending a meeting, and navigating to a geographic location;
determining at least one action parameter for undertaking the action; and
presenting the user with a prompt to facilitate undertaking the action using the at least one parameter.

2. The method of claim 1, wherein the extracting further comprises: converting the recorded voice message from speech to text; and extracting the action from the text.

3. The method of claim 2, wherein the extracting further comprises extracting the action parameter from the text.

4. The method of claim 1, wherein the action parameter is a source telephone number associated with the caller.

5. The method of claim 4, wherein the source telephone number is obtained from a contact book of the user.

6. The method of claim 4, wherein the source telephone number is obtained from caller identification.

7. The method of claim 1, wherein the action is for the user to call back the caller, and the at least one action parameter comprises the name or telephone number of the caller, and wherein the prompt asks the user if they would like to call back the caller.

8. The method of claim 1, wherein the action is for the user to call a person other than the caller, and the at least one action parameter comprises the name and telephone number of the person, and wherein the prompt asks the user if they would like to call back the person.

9. The method of claim 1, wherein the at least one parameter includes a specific time period, and the presenting of the prompt occurs at or before the specific time period.

10. The method of claim 1, wherein the action is to store contact details in a contact book of the user, and the at least one parameter comprises contact details.

11. The method of claim 1, wherein the action is to check on the user's availability, and the at least one parameter is retrieved from a calendar of the user.

12. The method of claim 1, wherein the action is send an email to the caller, and the at least one parameter is an email address of the caller, and wherein the prompt presents the user with an option to send an email message to the email address.

13. The method of claim 12, wherein presenting the prompt further comprises:
in a voice mail retrieval user interface, requesting user confirmation regarding whether to prepare an email to the email address; and upon user confirmation, presenting a draft email including the email address as a destination address and a transcript of the recorded voice message in a body of the draft email on the user device.

14. The method of claim 12, further comprising:
identifying an existing contact in a contact list associated with the user based on at least one of a source telephone number from which the recorded voice message originated and a name extracted from the recorded voice message, wherein the prompt offers to the user an option to store the email address extracted from the recorded voice message in association with the identified existing contact in the contact list.

15. The method of claim 12, wherein presenting the prompt further comprises:
in a voice mail retrieval user interface, requesting user confirmation regarding whether to prepare a reply email to an incoming email mentioned in the recorded voice message; and upon user confirmation, presenting a draft reply email to the incoming email mentioned in the recorded voice message.

16. The method of claim 1, wherein the action is to send the caller certain information in a text message, and the at least one parameter is an telephone number or email address of the caller, and wherein the prompt presents the user with an option to send a text message to the telephone number.

17. The method of claim 1, wherein presenting the prompt further comprises:
in a voicemail retrieval user interface, presenting a user interface element for initiating a telephone call to a telephone number extracted from the recorded voice message, in addition to a user interface element for initiating a telephone call to a source telephone number from which the recorded voice message originated.

18. The method of claim 1, wherein the extracting further comprises:
identifying an existing contact in a contact list associated with the user based on at least one of a source telephone number from which the recorded voice message originated and a name extracted from the recorded voice message; and
in accordance with a determination that the recorded voice message contains a telephone number that is different from an existing telephone number associated with the identified existing contact, offering to the user an option to store the telephone number extracted from the recorded voice message in association with the identified existing contact in the contact list.

19. A method of operating a digital assistant, comprising:
at a device having one or more processors and memory:
providing a recorded voice message from a caller to a user; and
without user input:
extracting from the voice message a proposed action to be performed by the user;
determining at least one action parameter for undertaking the action; and
presenting the user with a prompt to facilitate undertaking the action using the at least one parameter, wherein presenting the prompt further comprises presenting the user with an option to store the specified geographic location as a reminder or calendar entry, wherein the action is to meet at a specified geographic location, and the at least one action parameter comprises a name or an address of the geographic location, and wherein the at least one action parameter also includes a time period and the prompt presents the user with an option to store a reminder or calendar entry for meeting at the specified geographic location at the time period.

20. The method of claim 19, wherein presenting the prompt further comprises presenting an option to the user to provide navigation to the specified geographic location.

21. A non-transitory computer-readable storage medium storing one or more programs for execution by the one or more processors, the one or more programs comprising instructions for:
providing a recorded voice message from a caller to a user; and
without user input:
extracting from the recorded voice message a proposed action to be performed by the user, wherein extracting the proposed action comprises determining the proposed action from a plurality of proposed actions, wherein the proposed actions include at least one of:

calling back the caller, calling a person other than the caller, storing contact details in a contact book of the user, sending an email to the caller, sending a text message to the caller, visiting a webpage, watching an online video, recommending to download or purchase a software application, reminding to perform a task, performing a task, entering a calendar entry, attending a meeting, and navigating to a geographic location;

determining at least one action parameter for undertaking the action; and presenting a prompt to the user to perform the action in accordance with the parameter.

22. The non-transitory computer-readable storage medium of claim 21, wherein the extracting further comprises: converting the recorded voice message from speech to text; and extracting the action from the text.

23. The non-transitory computer-readable storage medium of claim 21, wherein the extracting further comprises extracting the action parameter from the text.

24. The non-transitory computer-readable storage medium of claim 21, wherein the action parameter is a source telephone number associated with the caller.

25. The non-transitory computer-readable storage medium of claim 24, wherein the source telephone number is obtained from a contact book of the user.

26. A cellular telephone comprising:

a processor; and memory coupled to the processor, the memory comprising instructions for:

receiving a voice message from a caller to a user of the telephone; and automatically, without user input:

extracting from the recorded voice message a proposed action to be performed by the user, wherein extracting the proposed action comprises determining the proposed action from a plurality of proposed actions, wherein the proposed actions include at least one of: calling back the caller, calling a person other than the caller, storing contact details in a contact book of the user, sending an email to the caller, sending a text message to the caller, visiting a webpage, watching an online video, recommending to download or purchase a software application, reminding to perform a task, performing a task, entering a calendar entry, attending a meeting, and navigating to a geographic location;

determining at least one action parameter for undertaking the action; and presenting a prompt to the user to perform the action in accordance with the parameter.

27. The cellular telephone of claim 26, wherein the extracting further comprises: converting the recorded voice message from speech to text; and extracting the action from the text.

28. The cellular telephone of claim 26, wherein the extracting further comprises extracting the action parameter from the text.

29. The cellular telephone of claim 26, wherein the action parameter is a source telephone number associated with the caller.

* * * * *